United States Patent
You et al.

(10) Patent No.: US 9,984,001 B2
(45) Date of Patent: May 29, 2018

(54) MEMORY SYSTEM FOR REDUCING PROGRAM PREPARATION OPERATION TIME AND OPERATION METHOD THEREOF

(71) Applicant: SK hynix Inc., Gyeonggi-do (KR)

(72) Inventors: Byoung-Sung You, Gyeonggi-do (KR); Jin-Woong Kim, Gyeonggi-do (KR); Jong-Min Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days. days.

(21) Appl. No.: 15/204,401

(22) Filed: Jul. 7, 2016

(65) Prior Publication Data

US 2017/0220472 A1    Aug. 3, 2017

(30) Foreign Application Priority Data

Feb. 1, 2016    (KR) .......................... 10-2016-0012395

(51) Int. Cl.
*G11C 16/04* (2006.01)
*G06F 12/0868* (2016.01)
*G06F 12/02* (2006.01)
*G06F 12/06* (2006.01)
*G06F 12/0804* (2016.01)

(52) U.S. Cl.
CPC ...... *G06F 12/0868* (2013.01); *G06F 12/0246* (2013.01); *G06F 12/0607* (2013.01); *G06F 12/0804* (2013.01); *G06F 2212/1021* (2013.01); *G06F 2212/2022* (2013.01); *G06F 2212/281* (2013.01); *G06F 2212/312* (2013.01); *G06F 2212/608* (2013.01); *G06F 2212/7203* (2013.01)

(58) Field of Classification Search
CPC ............. G06F 12/0868; G06F 12/0804; G06F 2212/608; G06F 2212/281; G06F 2212/1021; G06F 2212/2022; G06F 2212/312
USPC .................................................... 365/185.03
See application file for complete search history.

(56) References Cited

U.S. PATENT DOCUMENTS

| 6,373,746 B1* | 4/2002 | Takeuchi | ............. | G11C 7/1051 |
| | | | | 365/185.03 |
| 2014/0115241 A1* | 4/2014 | Wei | ..................... | G06F 12/0246 |
| | | | | 711/103 |

FOREIGN PATENT DOCUMENTS

| KR | 1020150080819 | 7/2015 |
| KR | 1020170008339 | 1/2017 |

* cited by examiner

*Primary Examiner* — Tha-O H Bui
(74) *Attorney, Agent, or Firm* — IP & T Group LLP

(57) ABSTRACT

A memory system may include a plurality of first and second memory devices each comprising M-bit multi-level cells (MLCs), M-bit multi-buffers, and transmission buffers, a cache memory suitable for caching data inputted to or outputted from the plurality of first and second memory devices, and a controller suitable for programming program data cached by the cache memory to a memory device selected among the first and second memory devices by transferring the program data to M-bit multi-buffers of the selected memory device whenever the program data are cached by M bits into the cache memory, and controlling the selected memory device to perform a necessary preparation operation, except for a secondary preparation operation, of a program preparation operation, until an input of the program data is ended or the M-bit multi-buffers of the selected memory device are full.

8 Claims, 15 Drawing Sheets

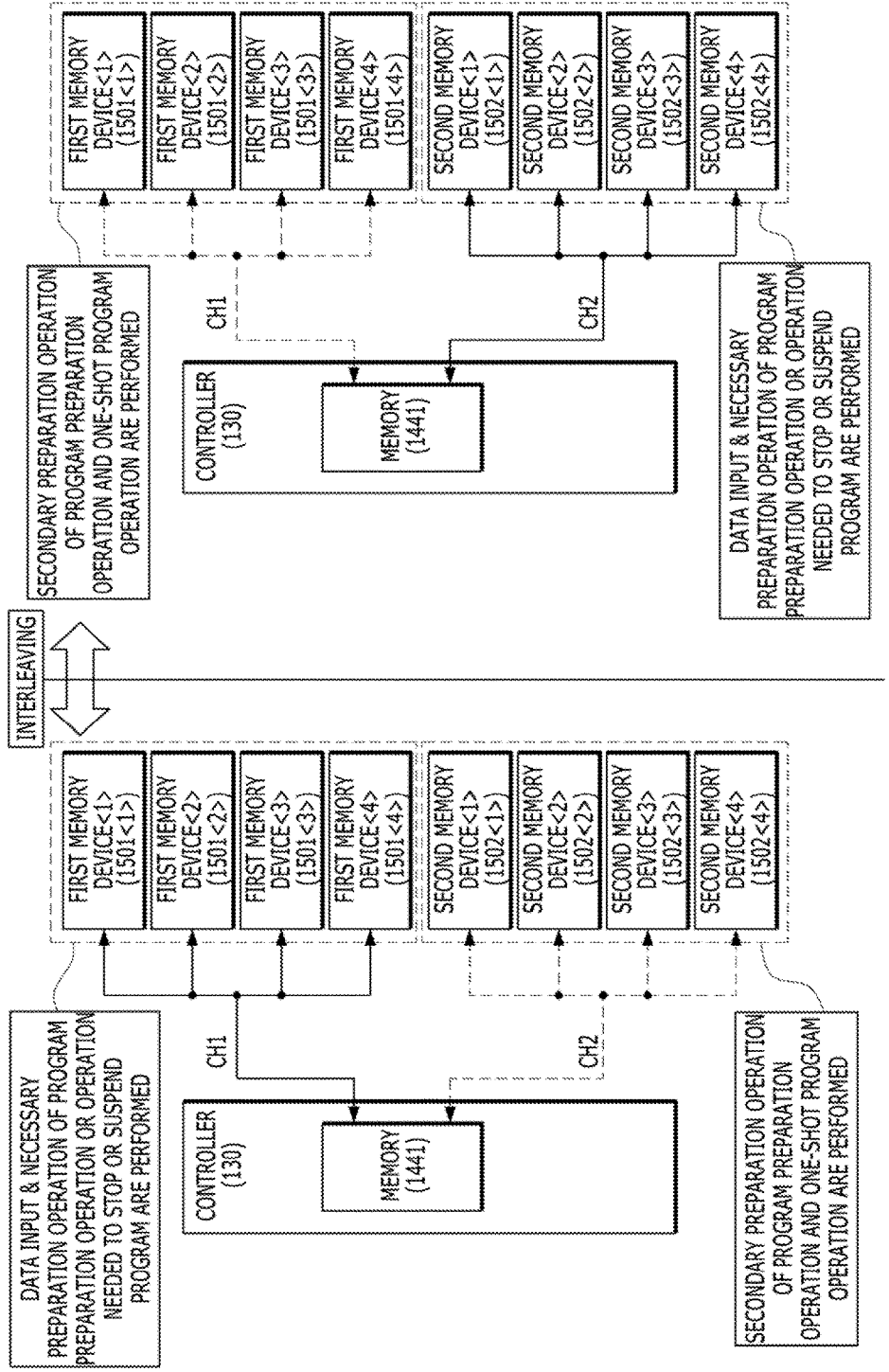

MEMORY SYSTEM FOR REDUCING PROGRAM PREPARATION OPERATION TIME AND OPERATION METHOD THEREOF

CROSS-REFERENCE TO RELATED APPLICATIONS

This application claims priority under 35 U.S.C. § 119 to Korean Patent Application No. 10-2016-0012395, filed on Feb. 1, 2016 in the Korean Intellectual Property Office, the disclosure of which is incorporated herein by reference in its entirety.

BACKGROUND

1. Field

Exemplary embodiments of the present invention relate to a semiconductor design technology and, more particularly, to a data input/output operation of a memory system which includes multi-level cells.

2. Description of the Related Art

The computer environment paradigm has shifted to ubiquitous computing systems that can be used anywhere and anytime. As a result use of portable electronic devices, such as mobile phones, digital cameras, and notebook computers has been increasing rapidly. These portable electronic devices may use a memory system having a memory device for storing data. A memory system may be used as a main or an auxiliary memory device of a portable electronic device.

Memory systems using semiconductor memory devices provide excellent stability, durability, high information access speed, and low power consumption since they have no moving parts. Examples of memory systems having such advantages include universal serial bus (USB) memories, memory cards having various interfaces, and solid state drives (SSD).

SUMMARY

Various embodiments are directed to a memory system which is capable of rapidly and stably suspending or stopping a program operation even when the program operation is suddenly suspended or stopped after the memory system starts a program operation, and an operation method thereof.

In an embodiment, a memory system may include: a plurality of first and second memory devices each comprising M-bit multi-level cells (MLCs), M-bit multi-buffers, and one or more transmission buffers, wherein M is an integer equal to or more than 2; a cache memory suitable for caching data inputted to or outputted from the plurality of first and second memory devices; and a controller suitable for programming program data cached by the cache memory to a memory device selected among the first and second memory devices by transferring the program data to M-bit multi-buffers of the selected memory device whenever the program data are cached by M bits into the cache memory, and controlling the selected memory device to perform a necessary preparation operation, except for a secondary preparation operation, of a program preparation operation, until an Input of the program data is ended or the M-bit multi-buffers of the selected memory device are full.

When the input of the program data is ended or the M-bit buffers of the selected memory device are full, the controller may control the selected memory device to perform the secondary preparation operation of the program preparation operation, and then one-shot programs data stored in the M-bit multi-buffers of the selected memory device to first M-bit MLCs of the selected memory device through transmission buffers of the selected memory device.

The necessary preparation operation of the program preparation operation may include a data sorting operation of sorting the data stored in the M-bit multi-buffers of the selected memory device; and the secondary preparation operation of the program preparation operation may include a data checking operation of checking data which are sorted and stored in the M-bit multi-buffers of the selected memory device through the data sorting operation, and an operation of generating a voltage which is used when data checked through the data check operation are one-shot programmed to the first M-bit MLCs of the selected memory device.

When a read operation is requested for the selected memory device before the input of the program data is ended or the M-bit multi-buffers of the first memory devices are full while the program data are programmed to the selected memory device, the controller may output read data from second M-bit MLCs of the selected memory device through the transmission buffers of the selected memory device one bit by one bit, without using the M-bit multi-buffers of the selected memory device.

While each of the first memory devices may perform the secondary preparation operation of the program preparation operation and data stored in the M-bit multi-buffers of the first memory device are one-shot programmed to the M-bit MLCs thereof, each of the second memory devices performs the necessary preparation operation, except for the secondary preparation operation, of the program preparation operation and the program data are stored in the M-bit multi-buffers of the second memory device; and while each of the second memory devices may perform the secondary preparation operation of the program preparation operation and data stored in the M-bit multi-buffers of the second memory device are one-shot programmed to the M-bit MLCs thereof, each of the first memory devices performs the necessary preparation operation, except for the secondary preparation operation, of the program preparation operation and the program data are stored in the M-bit multi-buffers of the first memory device.

The read data may include data outputted from a memory block selected by a request of a host or valid data outputted from a victim block of the first or second memory devices during a garbage collection operation.

The program data may include data which are to be stored in a memory block selected by a request of a host or valid data which are to be stored in a target block of the first or second memory devices during a garbage collection operation.

In an embodiment, an operation method of a memory system which includes a plurality of first and second memory devices each including M-bit multi-level cells (MLCs), M-bit multi-buffers, and one or more transmission buffers, wherein the M is an integer equal to or more than 2, and a cache memory for caching data inputted to or outputted from the plurality of first and second memory devices, the operation method may include: transferring program data cached by the cache memory to M-bit multi-buffers of a memory device selected among the first and second memory devices, whenever the program data are cached by M bits into the cache memory, to program the program data to the selected memory device; and controlling the selected memory device to perform a necessary preparation operation, except for a secondary preparation operation, of a program preparation operation, until all of the program data are stored in the M-bit multi-buffers of the selected memory device or the M-bit multi-buffers of the selected memory device are full through the transferring of the program data.

The operation method may further include, when all of the program data are stored in the M-bit multi-buffers of the selected memory device or the M-bit multi-buffers of the selected memory device are full through the transferring of the program data: controlling the selected memory device to perform the secondary preparation operation of the program preparation operation; and one-shot programming data stored in the M-bit multi-buffers of the selected memory device to first M-bit MLCs of the selected memory device through transmission buffers of the selected memory device.

The necessary preparation operation of the program preparation operation may include a data sorting operation of sorting the data stored in the M-bit multi-buffers of the selected memory device, and the secondary preparation operation of the program preparation operation may include a data checking operation of checking data which are sorted and stored in the M-bit multi-buffers of the selected memory device through the data sorting operation, and an operation of generating a voltage which is used when data checked through the data check operation are one-shot programmed to the first M-bit MLCs of the selected memory device.

The operation method may further include, outputting read data from second M-bit MLCs of the selected memory device through the transmission buffers of the selected memory device one bit by one bit, without using the M-bit buffers of the selected memory device, when a read operation is requested for the selected memory device while the program data are stored in the M-bit multi-buffers of the selected memory device through the transferring of the program data.

While each of the first memory devices may perform the secondary preparation operation of the program preparation operation and data stored in the M-bit multi-buffers of the first memory device are one-shot programmed to the M-bit MLCs thereof, each of the second memory devices performs the necessary preparation operation, except for the secondary preparation operation, of the program preparation operation and the program data are stored in the M-bit multi-buffers of the second memory device; and while each of the second memory devices may perform the secondary preparation operation of the program preparation operation and data stored in the M-bit multi-buffers of the second memory device are one-shot programmed to the M-bit MLCs thereof, each of the first memory devices performs the necessary preparation operation, except for the secondary preparation operation, of the program preparation operation and the program data are stored in the M-bit multi-buffers of the first memory device.

The read data may include data outputted from a memory block selected by a request of a host or valid data outputted from a victim block of the first or second memory devices during a garbage collection operation.

The program data may include data which are to be stored in a memory block selected by a request of a host or valid data which are to be stored in a target block of the first or second memory devices during a garbage collection operation.

In an embodiment, a memory system may include: a plurality of first and second memory devices each comprising M-bit multi-level cells (MLCs), M-bit multi-buffers, and one or more transmission buffers, wherein the M is an integer equal to or more than 2; a cache memory suitable for caching data inputted to or outputted from the plurality of first and second memory devices; and a controller suitable for programming program data cached by the cache memory to first MLCs of a memory device selected among the first and second memory devices through M-bit multi-buffers of the selected memory device. The controller may control the selected memory device to perform a necessary preparation operation of a program preparation operation while the program data are transferred to and stored in the M-bit multi-buffers thereof, and to perform a secondary preparation operation of the program preparation operation while data stored in the M-bit multi-buffers thereof are one-short programmed to the first MLCs through transmission buffers thereof.

The necessary preparation operation of the program preparation operation may include a data sorting operation of sorting the data stored in the M-bit multi-buffers of the selected memory device; and the secondary preparation operation of the program preparation operation may include a data checking operation of checking data which are sorted and stored in the M-bit multi-buffers of the selected memory device through the data sorting operation, and an operation of generating a voltage which is used when data checked through the data check operation are one-shot programmed to the first M-bit MLCs of the selected memory device.

While the selected memory device may perform the necessary preparation operation of the program preparation operation, the controller may output read data from second M-bit MLCs of the selected memory device through the transmission buffers of the selected memory device one bit by one bit, without using the M-bit multi-buffers thereof.

While the first memory devices may perform the secondary preparation operation of the program preparation operation, the second memory devices perform the necessary preparation operation of the program preparation operation; and while the second memory devices may perform the secondary preparation operation of the program preparation operation, the first memory devices perform the necessary preparation operation of the program preparation operation.

BRIEF DESCRIPTION OF THE DRAWINGS

FIGS. 17 and 18 are block diagrams illustrating an example in which a specific program operation is applied to the memory system of FIGS. 12 to 16, according to an embodiment of the present invention.

DETAILED DESCRIPTION

Figure 1:
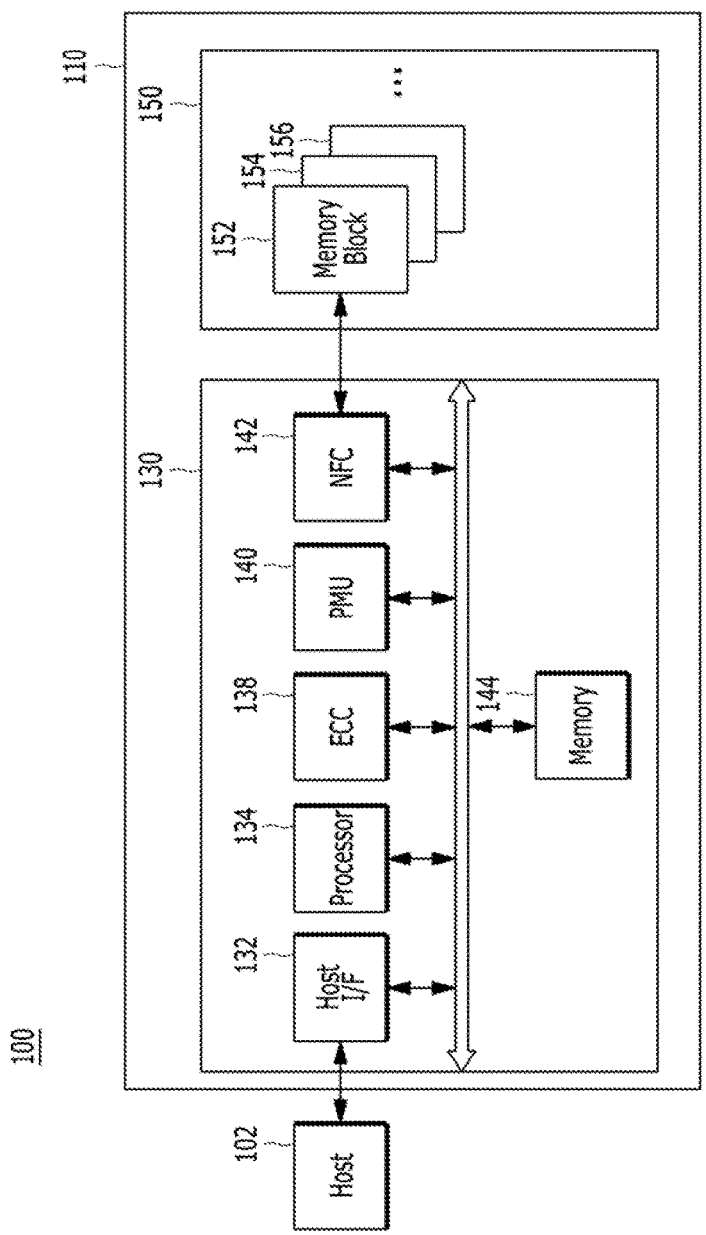
FIG. 1 is a diagram illustrating a data processing system including a memory system, according to an embodiment of the present invention.

Various embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may have diverse modifications and embodiments, and herein, some of the embodiments are taken as examples to describe the concept and scope of the present invention. However, it is obvious to those skilled in the art that the embodiments do not limit the concept and scope of the present invention. Also, the constituent elements of the embodiments of the present invention should be understood to include all modifications, substitutes and equivalents. In this respect, the following embodiments shown in FIGS. 1 to 9 which are used to describe the principle of the present invention should be construed not to be restrictive but to be illustrative.

It will be further understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

In some instances, as would be apparent to one of ordinary skill in the art elements described in connection with a particular embodiment may be used singly or in combination with other embodiments unless otherwise specifically indicated.

Hereinafter, the various embodiments of the present invention will be described in detail with reference to the attached drawings.

Referring now to FIG. 1, a data processing system 100 is provided, according to an embodiment of the present invention. The data processing system 100 may include a host 102 and a memory system 110.

The host 102 may include any suitable electronic device. For example, the host 102 may include a portable electronic device such as a mobile phone, an MP3 player, a laptop computer and the like. The host may include a non-portable electronic device such as a desktop computer, a game player, a TV, a projector and the like.

The memory system 110 may store data to be accessed by the host 102 in response to a request from the host 102. The memory system 110 may be used as a main memory system or an auxiliary memory system of the host 102. The memory system 110 may be implemented to be coupled electrically with the host 102, according to a protocol of a host interface. One or more semiconductor memory devices may be used. Volatile or non-volatile memory devices may be used. For example, the memory system 110 may be implemented with a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as a dynamic random access memory (DRAM), a static random access memory (SRAM) and the like. Alternatively, the storage devices for the memory system 110 may be implemented a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may include a memory device 150 for storing data and a controller 130 for controlling storage of data in the memory device 150. The stored data in the memory device 150 may be accessed by the host 102.

The controller 130 and the memory device 150 may be integrated into a single semiconductor device. For instance, the controller 130 and the memory device 150 may be integrated into a semiconductor device configured as a solid state drive (SSD). Configuring the memory system 110 as a SSD, may generally allow a significant increase in an operation speed of the host 102.

The controller 130 and the memory device 150 may be integrated into a semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

Also, for example, the memory system 110 may be or comprise a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may store data provided from the host 102. During a read operation, the memory device 150 may provide the stored data to the host 102. One or more memory devices 150 may be employed. The one or more memory devices 150 may be substantially identical. The one or more memory devices may be different memory devices. The memory device 150 may include one or more memory blocks 152, 154 and 156. Each of the memory blocks 152, 154 and 156 may include a plurality of pages. Each of the pages may include a plurality of memory cells coupled electrically to a plurality of word lines (WL). The memory device 150 may be a nonvolatile memory device capable of retaining stored data even when a power supply is interrupted or turned off. According to an embodiment, the memory device may be a flash memory. The memory device may be a flash memory device having a three-dimensional (3D) stack structure. Examples of a non-volatile memory device 150 having a three-dimensional (3D) stack structure are described later herein with reference to FIGS. 2 to 11.

The controller 130 may control the overall operation of the memory device 150, such as, read, write, program and/or erase operations. Generally, the controller 130 may control the memory device 150 in response to a request from the host 102. For example, the controller 130 may provide data read from the memory device 150, to the host 102, in response to a read request from the host 102. Or, also as an example, the controller may store data provided from the host 102 into the memory device 150 in response to a write request.

Any suitable controller may be used. For example, the controller 130 may include a host interface unit 132, a processor 134, an error correction code (ECC) unit 138, a power management unit (PMU) 140, a NAND flash controller (NFC) 142, and a memory 144.

The host interface unit 132 may process commands and/or data provided from the host 102. The host interface unit 132 may communicate with the host 102 through at least one of various interface protocols, such as a universal serial bus (USB), a multimedia card (MMC), a peripheral component interconnect-express (PCI-E), a serial attached SCSI (SAS), a serial advanced technology attachment (SATA), a parallel advanced technology attachment (PATA), a small computer system interface (SCSI), an enhanced small disk interface (ESDI), integrated drive electronics (IDE) and the like. The host interface unit 132 may include any suitable circuits, systems or devices suitable for communicating with the host 102 and the other components of the controller 130 as may be needed.

The ECC unit 138 may detect and correct errors of the data read from the memory device 150 during a read operation. Various detection and correction techniques may be employed. For example, if the number of the error bits detected by the ECC unit 138 is greater than or equal to a threshold number of correctable error bits, the ECC unit 138 may not correct the error bits and output an error correction fail signal indicating failure in correcting the error bits.

The ECC unit 138 may perform an error correction operation based on any suitable error correction scheme. For example, the ECC unit 138 may perform an error correction operation based on a coded modulation scheme, such as, for example, a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include any suitable circuits, systems or devices required for an error detection and correction operation.

The PMU 140 may provide and manage electric power for the controller 130. For example, the PMU 140 may provide and manage electric power for the various components of the controller 130 as may be needed.

The NFC 142 may serve as a memory interface between the controller 130 and the memory device 150 to allow the controller 130 to control the memory device 150 in response to a request from the host 102. For example, the NFC 142 may generate control signals for the memory device 150. The NFC may process data under the control of the processor 134, for example, when the memory device 150 is a flash memory especially a NAND flash memory.

The memory 144 may serve as a working memory of the memory system 110 and the controller 130, and store data for driving the memory system 110 and the controller 130. For example, when the controller 130 controls the operations of the memory device 150, the memory 144 may store data used by the controller 130 and the memory device 150 for such operations as read, write, program and erase operations.

The memory 144 may be or comprise a volatile memory. For example, the memory 144 may be or comprise a static random access memory (SRAM) or a dynamic random access memory (DRAM). As described above, the memory 144 may store data used by the host 102 and the memory device 150 for read and/or write operations. The memory 144 may be or comprise a program memory, a data memory, a write buffer, a read buffer, a map buffer, and the like.

The processor 134 may control the general operations of the memory system 110. For example, the processor 134 may control a write operation for the memory device 150, in response to a write request from the host 102. Also, for example, the processor 134 may control a read operation for the memory device 150, in response to a read request from the host 102. The processor 134 may drive a firmware, also referred to as a flash translation layer (FTL), for controlling the general operations of the memory system 110. The processor 134 may be implemented with a microprocessor, a central processing unit (CPU) and the like. Any suitable processor may be used.

For example, a management unit (not shown) may be included in the processor 134 for performing bad block management of the memory device 150. Accordingly, the management unit may find bad memory blocks included in the memory device 150, i.e., memory blocks which are in an unsatisfactory condition for further use, and perform a bad block management operation the bad memory blocks. For example, when a flash memory, such as a NAND flash memory is employed as the memory device 150, a program failure may occur during a write operation due to inherent characteristics of a NAND logic function. During a bad block management, the data of the program-failed memory blocks (e.g., the bad memory blocks) may be programmed into a new memory block. The bad blocks due to a program fail may seriously deteriorate the utilization efficiency of a memory device, especially one having a 3D stack structure and thus negatively affect the reliability of the memory system 110.

Figure 2:
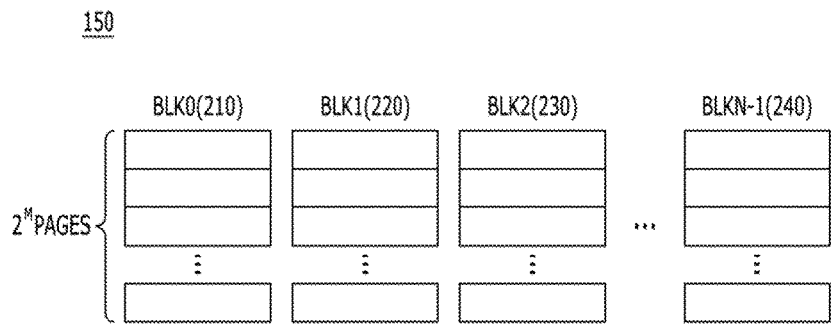
FIG. 2 is a diagram illustrating a memory device including a plurality of memory blocks, according to an embodiment of the present invention.

Referring to FIG. 2 the memory device 150 may include a plurality of memory blocks, for example, zeroth to (N−1) blocks 210 to 240, where N is a positive integer. Each of the plurality of memory blocks 210 to 240 may include a plurality of pages, for example, $2^M$ number of pages ($2^M$ PAGES), where M is a positive integer. Each of the plurality of pages may include a plurality of memory cells to which a plurality of word lines may be coupled electrically. It is noted that any number of suitable blocks and pages per block may be employed.

The memory blocks may be single level cell (SLC) memory blocks and/or multi-level cell (MLC) memory blocks, according to the number of bits which may be stored or expressed in each memory cell. An SLC memory block may include a plurality of pages which are implemented with memory cells each of which is capable of storing 1-bit data. An MLC memory block may include a plurality of pages which are implemented with memory cells each of which is capable of storing multi-bit data, for example, two or more-bit data. A MLC memory block including a plurality of pages which are implemented with memory cells each of which is capable of storing 3-bit data may be employed and will be referred to as a triple level cell (TLC) memory block.

Each of the plurality of memory blocks 210 to 240 may store data provided from the host device 102 during a write operation, and may provide stored data to the host 102 during a read operation.

Figure 3:
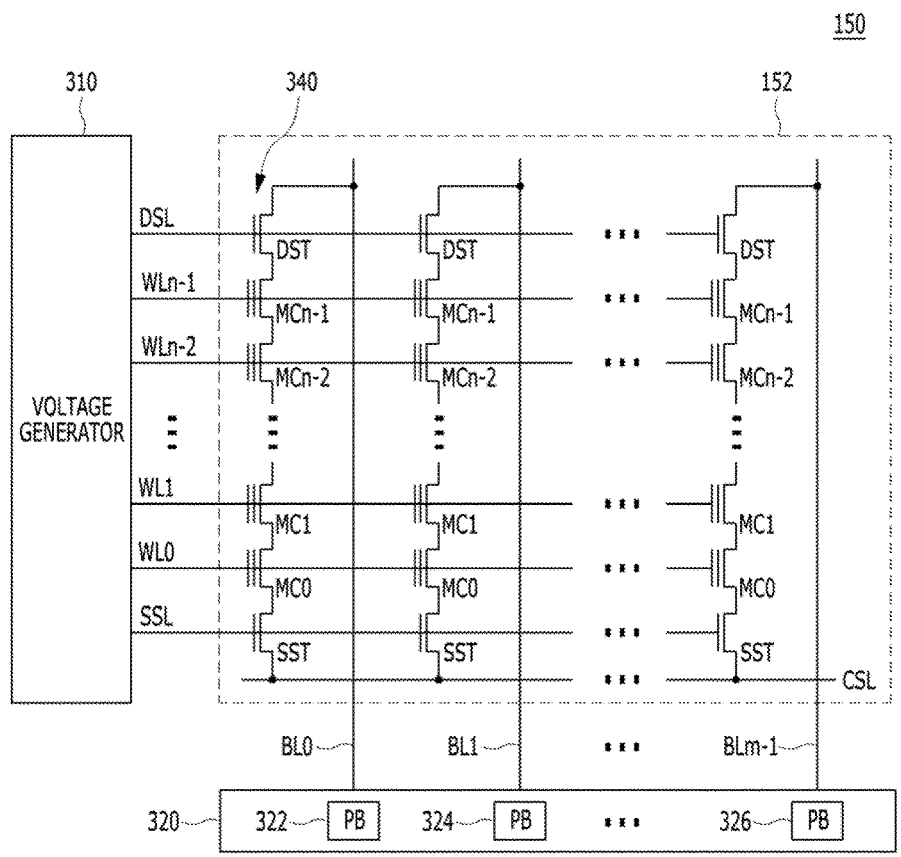
FIG. 3 is a circuit diagram illustrating a memory block of a memory device, according to an embodiment of the present invention.

Referring to FIG. 3, a memory block 152 of the memory device 150 may include a plurality of cell strings 340 coupled electrically to bit lines BL0 to BLm-1, respectively. Each cell string 340 may include at least one drain select transistor DST and at least one source select transistor SST. A plurality of memory cells or a plurality of memory cell transistors MC0 to MCn-1 may be coupled electrically in series between the select transistors DST and SST. The respective memory cells MC0 to MCn-1 may consist of multi-level cells (MLC) each of which stores data information of a plurality of bits. The memory cells may have any suitable architecture.

In FIG. 3, 'DSL' denotes a drain select line, 'SSL' denotes a source select line, and 'CSL' denotes a common source line.

FIG. 3 shows, as an example, a memory block 152 configured by NAND flash memory cells. It is to be noted, however, that the memory block 152 is not limited to NAND flash memory and may be realized, in other embodiments, by NOR flash memory, hybrid flash memory having at least two kinds of memory cells combined, or a NAND flash memory having a controller built in a memory chip. Also, the operational characteristics of a semiconductor device may be applied to not only a flash memory device in which a charge storing layer is configured by conductive floating gates but also to a charge trap flash (CTF) in which a charge storing layer is configured by a dielectric layer.

It is also noted that the memory device 150 is not limited to a flash memory device only. For example, the memory device 150 may be a DRAM or a SRAM device.

A voltage generator 310 of the memory device 150 may generate word line voltages, for example, a program voltage, a read voltage or a pass voltage, to be supplied to respective word lines according to an operation mode. The voltage generator 310 may generate voltages to be supplied to bulks, for example, well regions in which the memory cells are formed. The voltage generator 310 may perform a voltage generating operation under a control of a control circuit (not shown). The voltage generator 310 may generate a plurality of variable read voltages to generate a plurality of read data. The voltage generator 310 may select one of the memory blocks or sectors of a memory cell array, select one of the word lines of the selected memory block, and provide the word line voltages to the selected word line and unselected word lines, under the control of the control circuit.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver for driving bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to the columns (or bit lines) or pairs of the columns (or pairs of bit lines). Each of the page buffers 322, 324 and 326 may include a plurality of latches (not shown).

Figure 4:
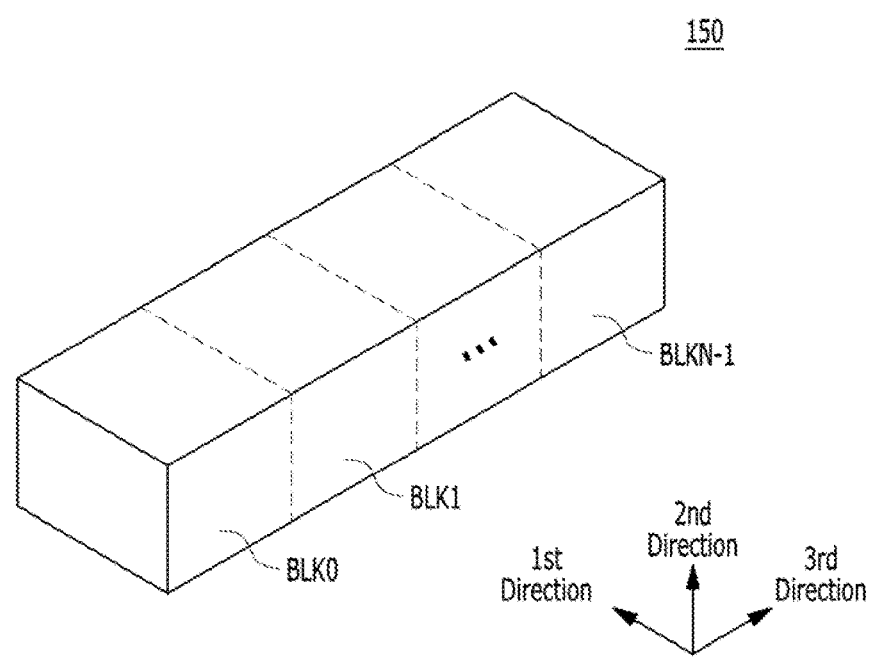
FIGS. 4, 5, 6, 7, 8, 9, 10, and 11 are diagrams schematically illustrating a memory device, according to various embodiments of the present invention.

FIG. 4 is a block diagram illustrating an example of the plurality of memory blocks 152 to 156 of the memory device 150, according to an embodiment of the present invention.

As shown in FIG. 4, the memory device 150 may include a plurality of memory blocks BLK0 to BLKN-1. Each of the memory blocks BLK0 to BLKN-1 may be realized in a 3D structure or a vertical structure. The respective memory blocks BLK0 to BLKN-1 may include a plurality of structures extending in first to third directions, for example, an x-axis direction, a y-axis direction and a z-axis direction.

Figure 8:
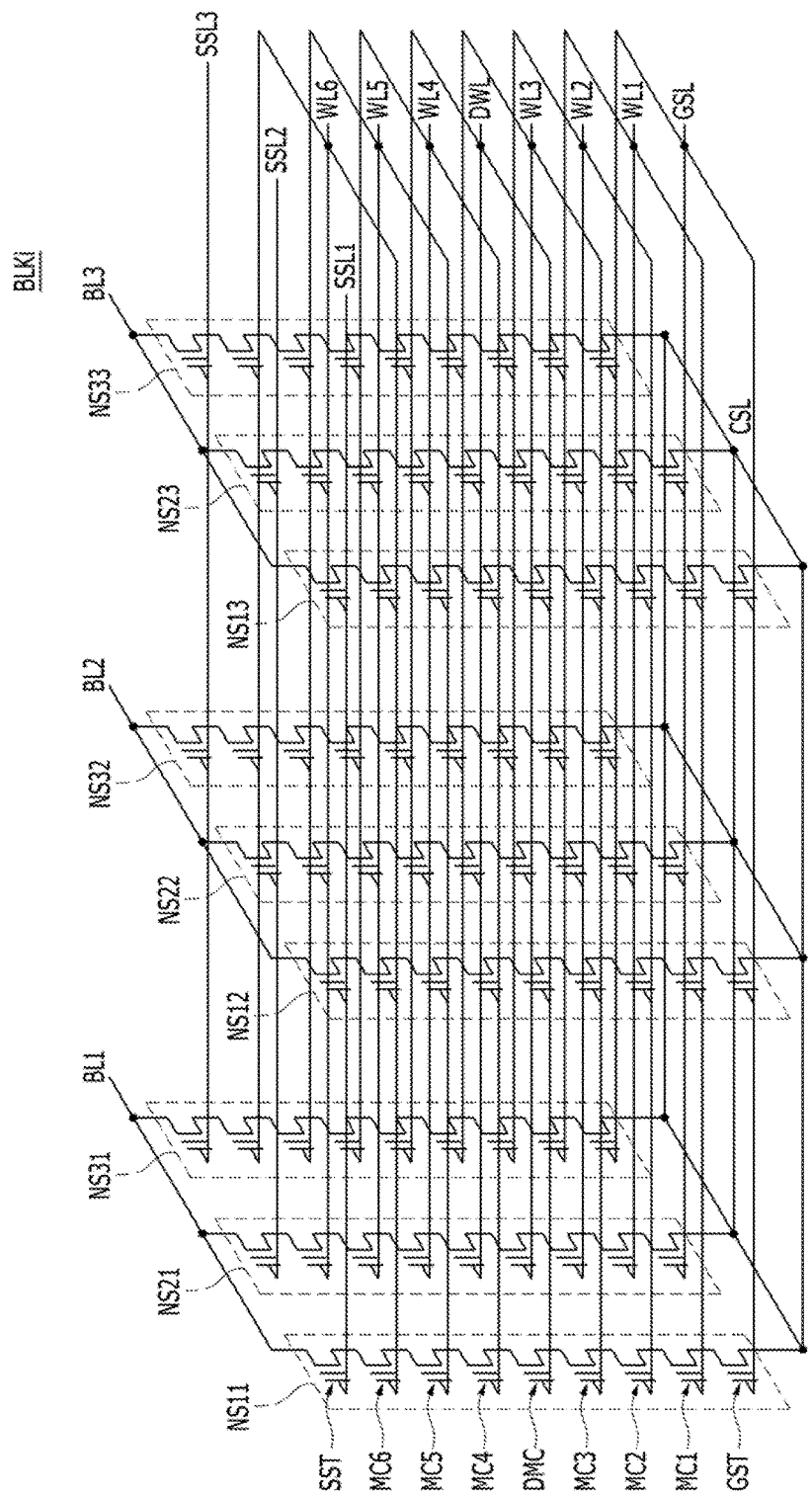

The respective memory blocks BLK0 to BLKN-1 may include a plurality of NAND strings NS extending in the second direction (FIG. 8). The plurality of NAND strings NS may be provided in the first direction and the third direction. Each NAND string NS may be coupled electrically to a bit line BL, at least one source select line SSL, at least one ground select line GSL, a plurality of word lines WL, at least one dummy word line DWL, and a common source line CSL. The respective memory blocks BLK0 to BLKN-1 may be coupled electrically to a plurality of bit lines BL, a plurality of source select lines SSL, a plurality of ground select lines GSL, a plurality of word lines WL, a plurality of dummy word lines DWL, and a plurality of common source lines CSL.

Figure 5:
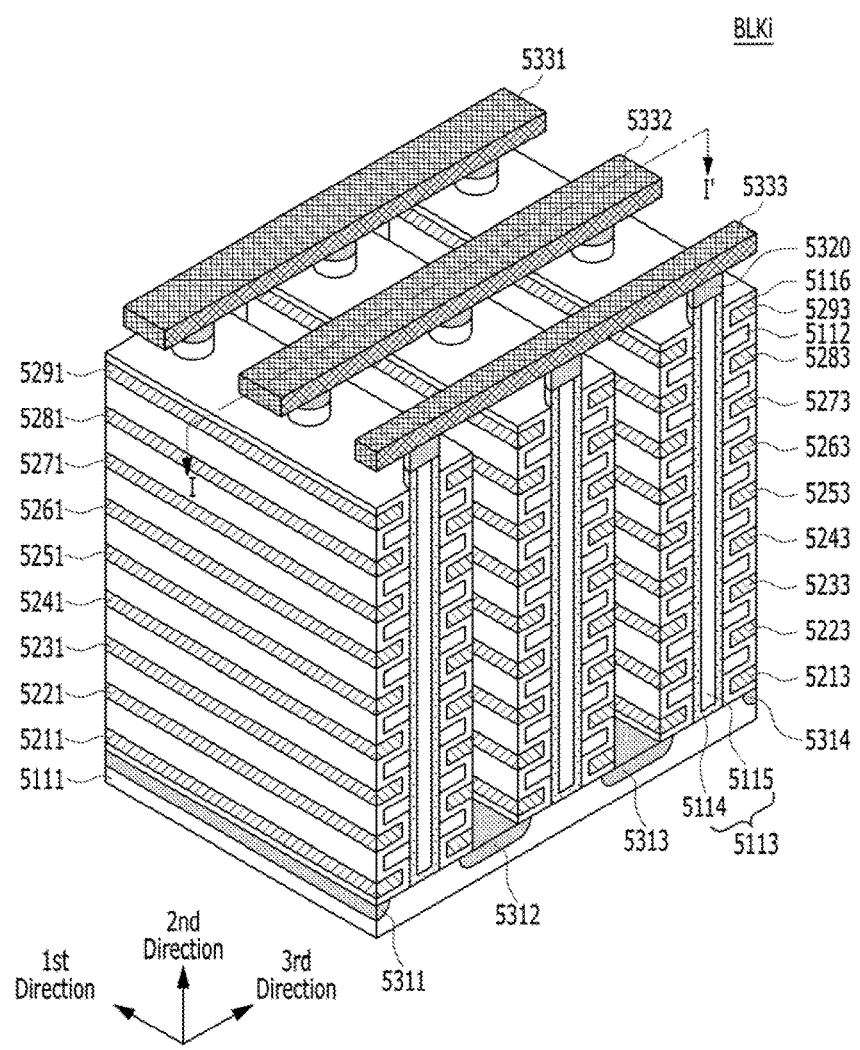
Figure 6:
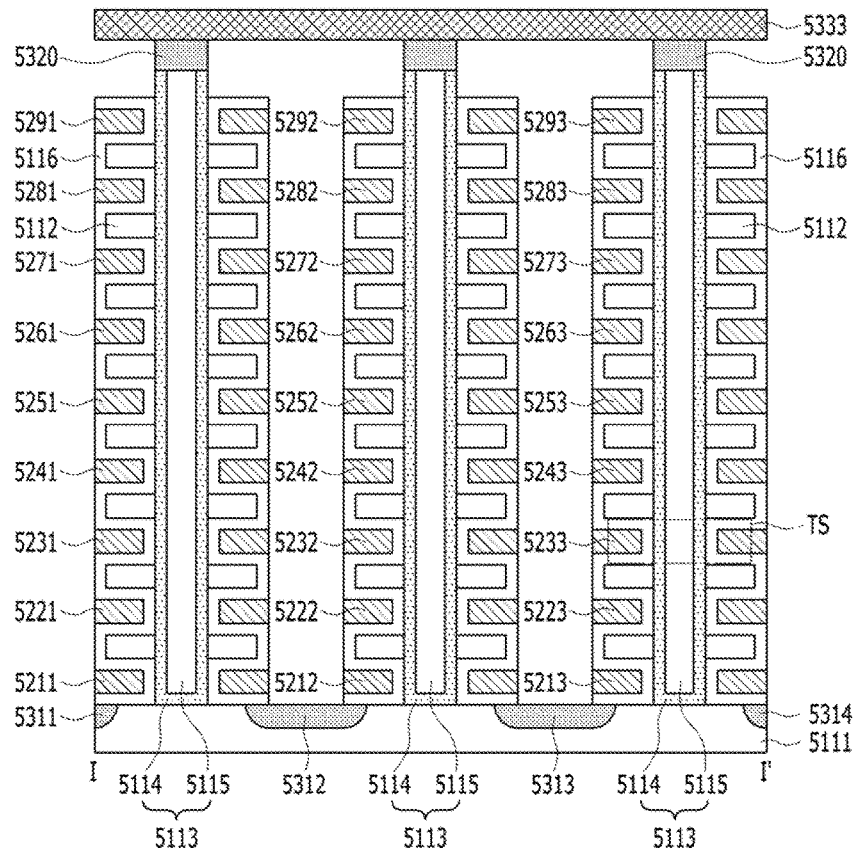

FIG. 5 is a perspective view of one memory block BLKi of the plurality memory blocks BLK0 to BLKN-1 shown in FIG. 4. FIG. 6 is a cross-sectional view taken along a line I-I' of the memory block BLKi shown in FIG. 5.

Referring to FIGS. 5 and 6, memory block BLKi may include a structure extending in the first to third directions.

The memory block may include a substrate 5111 including a silicon material doped with a first type impurity. For example, the substrate 5111 may include a silicon material doped with a p-type impurity. The substrate 5111 may be a p-type well, for example, a pocket p-well. The substrate 5111 may further include an n-type well surrounding the p-type well. Although, in the embodiment of the present invention, the substrate 5111 is exemplified as being the p-type silicon, it is to be noted that the substrate 5111 is not limited to the p-type silicon.

A plurality of doping regions 5311 to 5314 extending in the first direction may be provided over the substrate 5111. The doping regions are spaced apart at regular intervals in the third direction. The plurality of doping regions 5311 to 5314 may contain a second type impurity that is different from that of the impurity used in substrate 5111. For example, the plurality of doping regions 5311 to 5314 may be doped with an n-type impurity. Although, in the embodiment of the present invention, first to fourth doping regions 5311 to 5314 are exemplified as being the n-type, it is noted that they are not limited to the n-type.

In the region over the substrate 5111 between the first and second doping regions 5311 and 5312, a plurality of dielectric material regions 5112 extending in the first direction may be spaced apart at regular intervals in the second direction. The dielectric material regions 5112 may also be separated from the substrate 5111 by a preset distance in the second direction. Each of the dielectric material regions 5112 may be separated from one other by a preset distance in the second direction. The dielectric materials 5112 may include any suitable dielectric material, such as, silicon oxide.

In the regions over the substrate 5111 between two consecutive doping regions, for example, between doping regions 5311 and 5312, a plurality of pillars 5113 are spaced apart at regular intervals in the first direction. The plurality of pillars 5113 extend in the second direction and may pass through the dielectric material regions 5112 so that they may be coupled electrically with the substrate 5111. Each pillar 5113 may include one or more materials. For example, each pillar 5113 may include an in inner layer 5115 and an outer surface layer 5114. The surface layer 5114 may include a doped silicon material doped with an impurity. For example, the surface layer 5114 may include a silicon material doped with the same or same type impurity as the substrate 5111. Although, in the embodiment of the present invention, the surface layer 5114 is exemplified as including p-type silicon, the surface layer 5114 is not limited to the p-type silicon and other embodiments may readily envisaged by the skilled person wherein the substrate 5111 and the surface layer 5114 of the pillars 5113 may be doped with an n-type impurity.

The inner layer 5115 of each pillar 5113 may be formed of a dielectric material. The inner layer 5115 may be or include a dielectric material such as silicon oxide.

In the regions between the first and second doping regions 5311 and 5312, a dielectric layer 5116 may be provided along exposed surfaces of the dielectric material regions 5112, the pillars 5113 and the substrate 5111. A thickness of the dielectric layer 5116 may be less than one half of the distance between the dielectric material regions 5112. In other words, a region of a material other than the dielectric material 5112 and the dielectric layer 5116 may be provided between (i) the dielectric layer 5116 below the bottom surface of a first dielectric material of the dielectric material regions 5112 and (ii) the dielectric layer 5116 provided over the top surface of a second dielectric material of the dielectric material regions 5112. The dielectric material regions 5112 may lie below the first dielectric material.

In the regions between consecutive doping regions such as in the region between the first and second doping regions 5311 and 5312, a plurality of conductive material regions 5211 to 5291 may be provided over an exposed surface of the dielectric layer 5116. The plurality of the conductive material regions extending in the first direction may be spaced apart at regular intervals in the second direction in an interleaving configuration with the plurality of the dielectric material regions 5112. The dielectric layers 5116 fill the space between the conductive material regions and the dielectric material regions 5112. So for example, the conductive material region 5211 extending in the first direction may be provided between the dielectric material region 5112 adjacent to the substrate 5111 and the substrate 5111. In particular, the conductive material region 5211 extending in the first direction may be provided between (i) the dielectric layer 5116 disposed over the substrate 5111 and (ii) the dielectric layer 5116 disposed below the bottom surface of the dielectric material region 5112 adjacent to the substrate 5111.

Each of the conductive material regions 5211 to 5291 extending in the first direction may be provided between (i) a dielectric layer 5116 disposed over the top surface of one of the dielectric material regions 5112 and (ii) the dielectric layer 5116 disposed below the bottom surface of the next dielectric material region 5112. The conductive material regions 5221 to 5281 extending in the first direction may be provided between the dielectric material regions 5112. The top conductive material region 5291 extending in the first direction may be provided over the uppermost dielectric material 5112. The conductive material regions 5211 to 5291 extending in the first direction may be made of or include a metallic material. The conductive material regions 5211 to 5291 extending in the first direction may be made of or include a conductive material such as polysilicon.

In the region between the second doping region 5312 and third doping region 5313, the same structures as the structures between the first and second doping regions 5311 and 5312 may be provided. For example, in the region between the second and third doping regions 5312 and 5313, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5212 to 5292 extending in the first direction may be provided.

In the region between the third doping region 5313 and a fourth doping region 5314, the same structures as between the first and second doping regions 5311 and 5312 may be provided. For example, in the region between the third and fourth doping regions 5313 and 5314, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5213 to 5293 extending in the first direction may be provided.

Drains 5320 may be respectively provided over the plurality of pillars 5113. The drains 5320 may be made of silicon materials doped with second type impurities. The drains 5320 may be made of silicon materials doped with n-type impurities. Although for the sake of convenience of explanation, the drains 5320 are exemplified as including n-type silicon, it is noted that the drains 5320 are not limited to the n-type silicon. For example, the width of each drain 5320 may be larger than the width of each corresponding pillar 5113. Each drain 5320 may be provided in the shape of a pad over the top surface of each corresponding pillar 5113.

Conductive material regions 5331 to 5333 extending in the third direction may be provided over the drains 5320. Each of the conductive material regions 5331 to 5333 may be extendedly disposed over the drains 5320 serially arranged in the third direction with a preset separation distance to each other in the first direction. The respective conductive material regions 5331 to 5333 may be coupled electrically with the drains 5320 therebelow. The drains 5320 and the conductive material regions 5331 to 5333 extending in the third direction may be coupled electrically with through contact plugs. The conductive material regions 5331 to 5333 extending in the third direction may be made of a metallic material. The conductive material regions 5331 to 5333 extending in the third direction may be made of a conductive material such as polysilicon.

In FIGS. 5 and 6, the respective pillars 5113 may form strings together with the dielectric layer 5116 and the conductive material regions 5211 to 5291, 5212 to 5292 and 5213 to 5293 extending in the first direction. The respective pillars 5113 may form NAND strings NS together with the dielectric layer 5116 and the conductive material regions 5211 to 5291, 5212 to 5292 and 5213 to 5293 extending in the first direction. Each NAND string NS may include a plurality of transistor structures TS.

Figure 7:
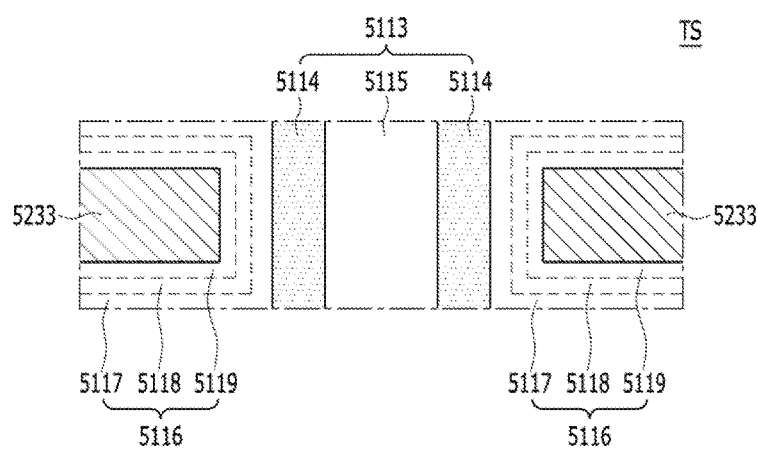

Referring now to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. For example, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience of explanation, the surface layer 5114 of p-type silicon in each of the pillars 5113 will be referred to as a body in the second direction.

The memory block BLKi may include the plurality of pillars 5113. For example, the memory block BLKi may include the plurality of NAND strings NS. In detail, the memory block BLKi may include the plurality of NAND strings NS extending in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive material regions 5211 to 5291, 5212 to 5292 and 5213 to 5293 extending in the first direction. For example, the gates or the control gates may extend in the first direction and form word lines and at least two select lines including at least one source select line SSL and at least one ground select line GSL.

The conductive material regions 5331 to 5333 extending in the third direction may be coupled electrically to one end of the NAND strings NS. The conductive material regions 5331 to 5333 extending in the third direction may serve as bit lines BL. For example, in one memory block BLKi, the plurality of NAND strings NS may be coupled electrically to one-bit line BL.

The second type doping regions 5311 to 5314 extending in the first direction may be provided to the other ends of the NAND strings NS. The second type doping regions 5311 to 5314 extending in the first direction may serve as common source lines CSL.

For example, the memory block BLKi may include a plurality of NAND strings NS extending in a direction perpendicular to the substrate 5111, e.g., the second direction, and may serve as a NAND flash memory block, for example, of a charge capturing type memory, in which the plurality of NAND strings NS are coupled electrically to one-bit line BL.

Although it is illustrated in FIGS. 5 to 7 that the conductive material regions 5211 to 5291, 5212 to 5292 and 5213 to 5293 extending in the first direction are provided by nine (9) layers, it is noted that the conductive material regions 5211 to 5291, 5212 to 5292 and 5213 to 5293 extending in the first direction are not limited thereto. For example, conductive material regions extending in the first direction may be provided in eight (8) layers, sixteen (16) layers or any multiple layers. For example, in one NAND string NS, the number of transistors may be 8, 16 or more.

Although it is illustrated in FIGS. 5 to 7 that three (3) NAND strings NS are coupled electrically to one-bit line BL, it is noted that the embodiment is not limited thereto. In the memory block BLKi, m NAND strings NS may be coupled electrically to one-bit line BL, m being a positive integer. The number of conductive material regions 5211 to 5291, 5212 to 5292 and 5213 to 5293 extending in the first direction and the number of common source lines 5311 to 5314 may be varied with the number of NAND strings NS which are coupled electrically to one-bit line BL.

Further, although it is illustrated in FIGS. 5 to 7 that three (3) NAND strings NS are coupled electrically to one conductive material extending in the first direction, it is noted that the embodiment is not limited thereto. For example, n NAND strings NS may be coupled electrically to one conductive material extending in the first direction, n being a positive integer. The number of bit lines 5331 to 5333 may be varied with the number of NAND strings NS which are coupled electrically to one conductive material extending in the first direction.

Referring to FIG. 8, in a block BLKi having the first structure, a plurality of NAND strings NS11 to NS31 may be provided between a first bit line BL1 and a common source line CSL. The first bit line BL1 may correspond to the conductive material region 5331 of FIGS. 5 and 6, extending in the third direction. NAND strings NS12 to NS32 may be provided between a second bit line BL2 and the common source line CSL. The second bit line BL2 may correspond to the conductive material region 5332 of FIGS. 5 and 6, extending in the third direction. NAND strings NS13 to NS33 may be provided between a third bit line BL3 and the common source line CSL. The third bit line BL3 may correspond to the conductive material region 5333 of FIGS. 5 and 6, extending in the third direction.

A source select transistor SST of each NAND string NS may be coupled electrically to a corresponding bit line BL. A ground select transistor GST of each NAND string NS may be coupled electrically to the common source line CSL. Memory cells MC1 and MC6 may be provided between the source select transistor SST and the ground select transistor GST of each NAND string NS.

In this example, the NAND strings NS may be defined by units of rows and columns. The NAND strings NS which are coupled electrically to one-bit line may form one column. The NAND strings NS11 to NS31 which are coupled electrically to the first bit line BL1 may correspond to a first column. The NAND strings NS12 to NS32 which are coupled electrically to the second bit line BL2 may correspond to a second column. The NAND strings NS13 to NS33 which are coupled electrically to the third bit line BL3 may correspond to a third column. The NAND strings NS which are coupled electrically to one source select line SSL may form one row. The NAND strings NS11 to NS13 which are coupled electrically to a first source select line SSL1 may form a first row. The NAND strings NS21 to NS23 which are coupled electrically to a second source select line SSL2 may form a second row. The NAND strings NS31 to NS33 which are coupled electrically to a third source select line SSL3 may form a third row.

In each NAND string NS, a height may be defined. In each NAND string NS, the height of the memory cell MC1 adjacent to the ground select transistor GST may have, for example, a value '1'. In each NAND string NS, the height of a memory cell may increase as the memory cell gets closer to the source select transistor SST when measured from the substrate 5111. For example, in each NAND string NS, the height of a memory cell MC6 adjacent to the source select transistor SST may have, for example, a value '7'.

The source select transistors SST of the NAND strings NS arranged in the same row may share the source select line SSL. The source select transistors SST of the NAND strings NS arranged in different rows may be respectively coupled electrically to the different source select lines SSL1, SSL2 and SSL3.

The memory cells at the same height in the NAND strings NS in the same row may share a word line WL. For example, at the same height, the word lines WL coupled electrically to the memory cells MC of the NAND strings NS in different rows may be coupled electrically with each other. Dummy memory cells DMC at the same height in the NAND strings NS of the same row may share a dummy word line DWL.

For example, at the same height or level, the dummy word lines DWL coupled electrically to the dummy memory cells DMC of the NAND strings NS in different rows may be coupled electrically with each other.

The word lines WL or the dummy word lines DWL located at the same level or height or layer may be coupled electrically with each other for each of the layers where the conductive material regions 5211 to 5291, 5212 to 5292 and 5213 to 5293 extending in the first direction may be provided. The conductive material regions 5211 to 5291, 5212 to 5292 and 5213 to 5293 extending in the first direction may be coupled electrically in common to upper layers through contacts. In other words, the ground select transistors GST of the NAND strings NS in the same row may share the ground select line GSL. Further, the ground select transistors GST of the NAND strings NS in different rows may share the ground select line GSL. For example, the NAND strings NS11 to NS13, NS21 to NS23 and NS31 to NS33 may be coupled electrically in common to the ground select line GSL.

The common source line CSL may be coupled electrically in common to the NAND strings NS. Over the active regions over the substrate 5111, the first to fourth doping regions 5311 to 5314 may be coupled electrically. The first to fourth doping regions 5311 to 5314 may be coupled electrically in common to an upper layer through contacts.

For example, as shown in FIG. 8, the word lines WL of the same height or level may be coupled electrically to each other. Accordingly, when a word line WL at a certain height is selected, all NAND strings NS which are coupled electrically to the selected word line WL may be selected. The NAND strings NS in different rows may be coupled electrically to different source select lines SSL. Accordingly, among the NAND strings NS coupled electrically to the same word line WL, by selecting one of the source select lines SSL1 to SSL3, the NAND strings NS in the unselected rows may be electrically isolated from the bit lines BL to BL3. In other words, by selecting one of the source select lines SSL1 to SSL3, the NAND strings NS arranged in the same row as the selected source line may be selected. Furthermore, by selecting one of the bit lines BL1 to BL3, the NAND strings NS arranged in the same column as the selected bit line may be selected. Accordingly, only the NAND strings NS arranged in the same row as the selected source line and the same column as the selected bit line may be selected.

In each NAND string NS, a dummy memory cell DMC may be provided. In FIG. 8, for example, the dummy memory cell DMC may be provided between a third memory cell MC3 and a fourth memory cell MC4 in each NAND string NS. For example, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into two (2) memory cell groups by the dummy memory cell DMC. In the divided memory cell groups, memory cells, for example, MC1 to MC3, adjacent to the ground select transistor GST may be referred to as a lower memory cell group, and remaining memory cells, for example, MC4 to MC6, adjacent to the string select transistor SST may be referred to as an upper memory cell group.

Herein below, detailed descriptions will be made with reference to FIGS. 9 to 11, which show a memory device in a memory system, according to an embodiment implemented with a three-dimensional (3D) nonvolatile memory device different from the first structure.

Figure 9:
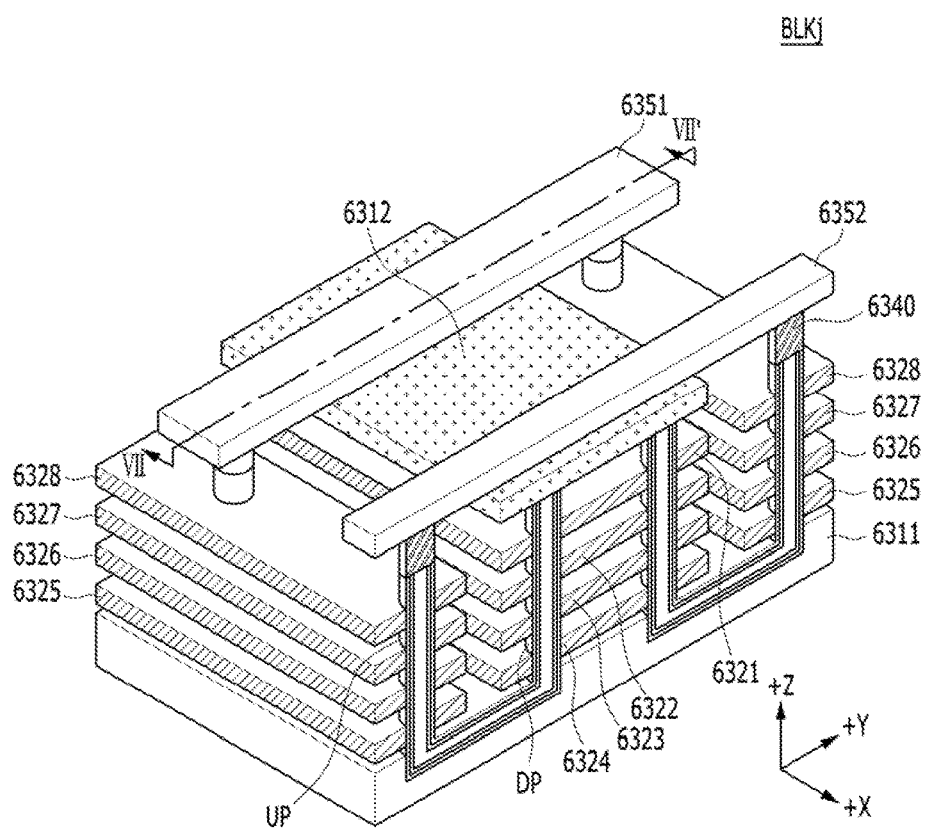

FIG. 9 is a perspective view schematically illustrating a memory device implemented with a three-dimensional (3D) nonvolatile memory device, which is different from the first structure described above with reference to FIGS. 5 to 8 and showing a memory block BLKj of the plurality of memory blocks of FIG. 4. FIG. 10 is a cross-sectional view illustrating the memory block BLKj taken along the line VII-VII' of FIG. 9.

Figure 10:
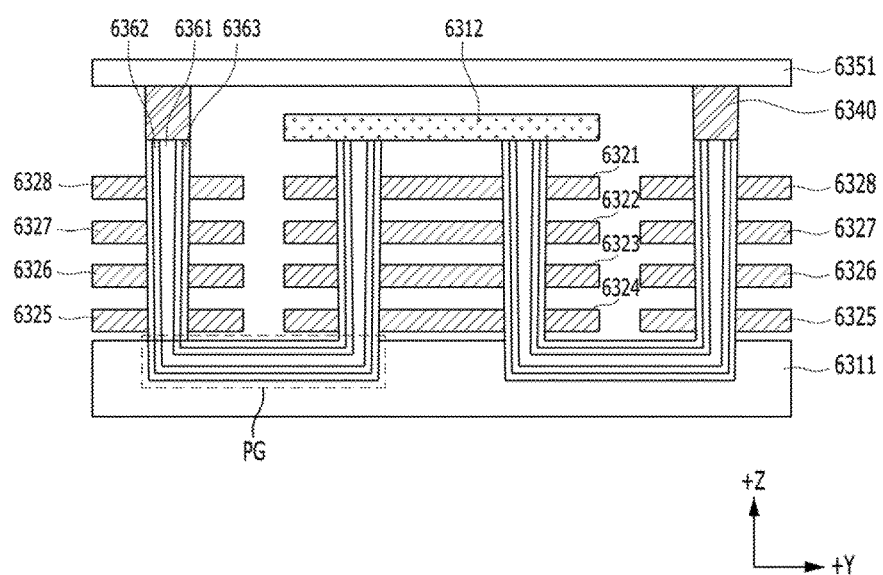

Referring to FIGS. 9 and 10, the memory block BLKj may include structures extending in the first to third directions and may include a substrate 6311. The substrate 6311 may include a silicon material doped with a first type impurity. For example, the substrate 6311 may include a silicon material doped with a p-type impurity. The substrate 6311 may be a p-type well, for example, a pocket p-well. The substrate 6311 may further include an n-type well which surrounds the p-type well. Although, in the described embodiment, the substrate 6311 is exemplified as being the p-type silicon, it is noted that the substrate 6311 is not limited to the p-type silicon.

First to fourth conductive material regions 6321 to 6324 extending in an x-axis direction and a y-axis direction are provided over the substrate 6311. The first to fourth conductive material regions 6321 to 6324 may be separated by a preset distance in the z-axis direction.

Fifth to eighth conductive material regions 6325 to 6328 extending in the x-axis direction and the y-axis direction may be provided over the substrate 6311. The fifth to eighth conductive material regions 6325 to 6328 may be separated by the preset distance in the z-axis direction. The fifth to eighth conductive material regions 6325 to 6328 may be separated from the first to fourth conductive material regions 6321 to 6324 in the y-axis direction.

A plurality of lower pillars DP passing through the first to fourth conductive material regions 6321 to 6324 may be provided. Each lower pillar DP may extend in the z-axis direction. Also, a plurality of upper pillars UP passing through the fifth to eighth conductive material regions 6325 to 6328 may be provided. Each upper pillar UP may extend in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower and the upper pillars DP and UP may be coupled electrically with each other through a pipe gate PG. The pipe gate PG may be disposed in the substrate 6311. For example, the pipe gate PG may include the same material as the lower pillar DP and the upper pillar UP.

A doping material 6312 of a second type extending in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive material regions 6351 and 6352 extending in the y-axis direction may be provided over the drains 6340.

The first and second upper conductive material regions 6351 and 6352 may be spaced apart along the x-axis direction. The first and second upper conductive material regions 6351 and 6352 may be formed of a metal. The first and second upper conductive material regions 6351 and 6352 and the drains 6340 may be coupled electrically with each other through contact plugs. The first and second upper conductive material regions 6351 and 6352 may serve as first and second bit lines BL1 and BL2, respectively.

The first conductive material 6321 may serve as a source select line SSL. The second conductive material 6322 may serve as a first dummy word line DWL1. The third and fourth conductive material regions 6323 and 6324 may serve as first and second main word lines MWL1 and MWL2, respectively. The fifth and sixth conductive material regions 6325 and 6326 may serve as third and fourth main word lines MWL3 and MWL4, respectively. The seventh conductive material 6327 may serve as a second dummy word line DWL2. The eighth conductive material 6328 may serve as a drain select line DSL.

The lower pillar DP and the first to fourth conductive material regions 6321 to 6324 adjacent to the lower pillar DP may form a lower string. The upper pillar UP and the fifth to eighth conductive material regions 6325 to 6328 adjacent to the upper pillar UP may form an upper string. The lower string and the upper string may be coupled electrically with each other through the pipe gate PG. One end of the lower string may be coupled electrically to the doping material 6312 of the second type which serves as the common source line CSL. One end of the upper string may be coupled electrically to a corresponding bit line through the drain 6340. One lower string and one upper string may form one cell string which is coupled electrically between the doping material 6312 serving as the common source line CSL and a corresponding one of the upper conductive material layers 6351 and 6352 serving as the bit line BL.

For example, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS. The NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
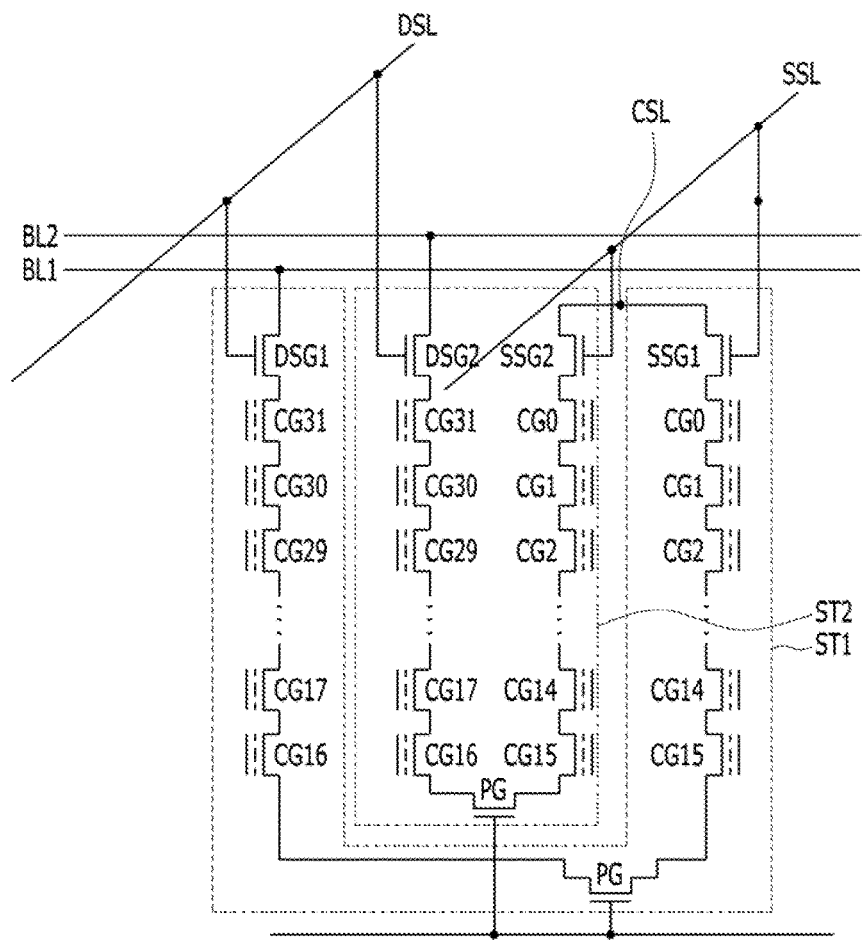

FIG. 11 is a circuit diagram illustrating the equivalent circuit of the memory block BLKj having the second structure as described above with reference to FIGS. 9 and 10. For the sake of convenience, only a first string ST1 and a second string ST2 are shown, forming a pair in the memory block BLKj in the second structure.

Referring to FIG. 11, in the memory block BLKj having the second structure, a plurality of cell strings, each of which is implemented with one upper string and one lower string coupled electrically through the pipe gate PG as described above with reference to FIGS. 9 and 10, may be provided, in such a way as to define a plurality of pairs.

For example, in memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first and the second strings ST1 and ST2 may be coupled electrically to the same drain select line DSL and the same source select line SSL. The first string ST1 may be coupled electrically to a first bit line BL1. The second string ST2 may be coupled electrically to a second bit line BL2.

Although FIG. 11 shows the first string ST1 and the second string ST2 are coupled electrically to the same drain select line DSL and the same source select line SSL, it may be envisaged that the first string ST1 and the second string ST2 may be coupled electrically to the same source select line SSL and the same bit line BL, the first string ST1 may be coupled electrically to a first drain select line DSL1 and the second string ST2 may be coupled electrically to a second drain select line DSL2. Further it may be envisaged that the first string ST1 and the second string ST2 may be coupled electrically to the same drain select line DSL and the same bit line BL, the first string ST1 may be coupled electrically to a first source select line SSL1 and the second string ST2 may be coupled electrically a second source select line SSL2.

Figure 12:
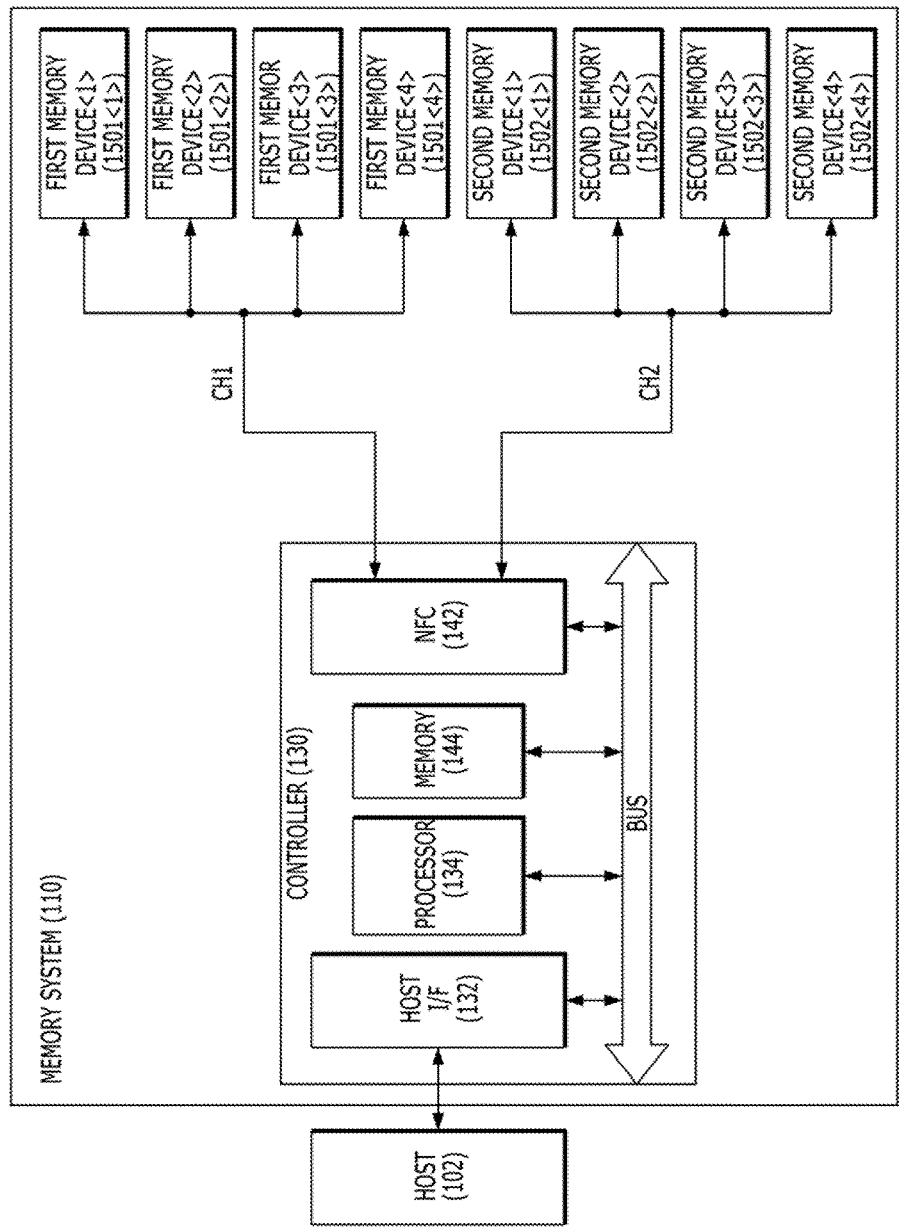
FIG. 12 is a block diagram illustrating a memory system including a plurality of memory devices, according to an embodiment of the present invention.

FIG. 12 illustrates a memory system 110, according to an embodiment of the present invention.

According to the embodiment of FIG. 12, the memory system 110 includes a plurality of first memory devices 1501<1:4> and second memory devices 1502<1:4>. For reference, FIG. 12 illustrates that the memory system 110 includes four memory devices as the plurality of first memory devices 1501<1:4>, and four memory devices as the plurality of second memory devices 1502<1:4>. However, this is only an example, and a larger or smaller number of memory devices may be included as the plurality of first memory devices 1501<1:4> or the plurality of second memory devices 1502<1:4>. Furthermore, FIG. 12 illustrates that the ECC unit 138 and the power management unit 140 included in the controller 130 of FIG. 1 are not included in the controller 130 of FIG. 12. However, the Illustration of these units was omitted for facilitating the depiction of the plurality of first and second memory devices. Hence, ECC unit 138 and the power management unit 140 of the controller 130 of FIG. 1 may also be included in the controller 130 of FIG. 12.

Specifically, the memory system 110 illustrated in FIG. 12 may include the controller 130, the plurality of first memory devices 1501<1:4>, and the plurality of second memory devices 1502<1:4>. The controller 130 may include a host interface 132, a processor 134, a memory 144, and a memory interface 142.

The plurality of first memory devices 1501<1:4> may be coupled to the memory interface 142 through a first channel CH1, and to a bus BUS in the controller 130 through the interface 142.

The plurality of second memory devices 1502<1:4> may be coupled to the memory interface 142 through a second channel CH2, to the bus BUS in the controller 130 through the interface 142.

The plurality of first memory devices 1501<1:4> and the plurality of second memory devices 1502<1:4> may be operated according to an interleaving scheme.

It is noted, however, that the configuration in which the plurality of first memory devices 1501<1:4> and the plurality of second memory devices 1502<1:4> are coupled to the controller 130 through different channels CH1 and CH2 and are operated according to an interleaving scheme is only an example. According to another embodiment, employing a different circuit design, the plurality of first memory devices 1501<1:4> and the plurality of second memory devices 1502<1:4> may be coupled to the controller in a different manner and may still be operated according to the same interleaving scheme as the embodiment of FIG. 12. For example, the plurality of first memory devices 1501<1:4> and the plurality of second memory devices 1502<1:4> may be coupled to the controller through the same channel and may be operated according to the interleaving scheme.

The host 102 may be coupled to the bus BUS through the host interface 132.

As illustrated in FIG. 1, the memory 144 may serve as a working memory of the controller 130, and store commands, addresses, and data required for the controller 130 to control the plurality of first and second memory devices 1501<1:4> and 1502<1:4>.

The memory 144 may serve as a cache memory for caching data which are inputted to or outputted from the plurality of first memory devices 1501<1:4> and the plurality of second memory devices 1502<1:4>.

For example, the memory 144 may serve as a write cache memory for caching program data which are to be stored in the plurality of first and second memory devices 1501<1:4> and 1502<1:4>. Similarly, the memory 144 may serve as a read cache memory for caching data which are read from the plurality of first and second memory devices 1501<1:4> and 1502<1:4>.

As described with reference to FIG. 1, the processor 134 may control the overall operations of the memory system 110.

Figure 13:
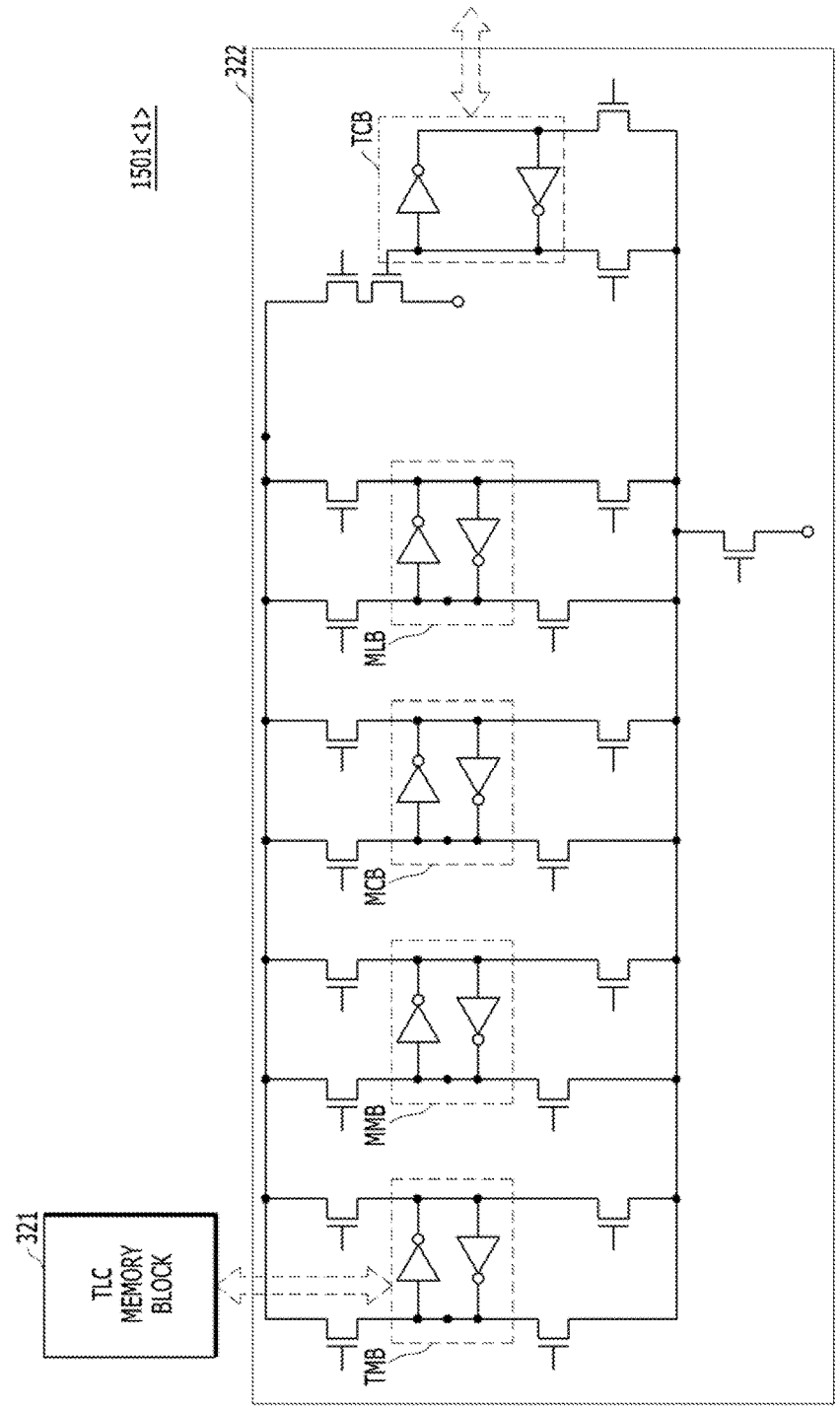
FIG. 13 is a diagram illustrating a detailed configuration of each of the memory devices in the memory system of FIG. 12, according to an embodiment of the present embodiment.

Referring now to FIG. 13 a detailed configuration of each of the memory devices in the memory system of FIG. 12 is provided, according to an embodiment of the present invention. For example, FIG. 13 shows an example of how the first memory device 1501<1> may be configured.

Specifically, as described with reference to FIGS. 1 to 3, each of the first and second memory devices 1501<1:4> and 1502<1:4> may include a plurality of memory blocks 152, 154, and 156, and each of the memory blocks 152, 154, and 156 may include a plurality of memory cells (not illustrated).

In the illustrated embodiment of FIG. 13, the memory cells included in each of the plurality of the first and second memory devices 1501<1:4> and 1502<1:4> include triple level cells (TLC) each capable of storing 3-bit data at a time.

For example, FIG. 13 illustrates that the first memory device 1501<1> includes TLC memory blocks 321 and 322 having TLCs. However, this is only an example. According to another embodiment, employing another circuit design, each of the first and second memory devices 1501<1:4> and 1502<1:4> may include MLCs such as double level cells, which store a smaller number of data, or MLCs such as quad, hexa, or octo-level cells, which store a larger number of data, than the TLCs.

The memory system 110 in accordance with the present embodiment may support a one-shot program operation, i.e., the memory system 110 may support an operation of programming 3-bit data to a TLC at the same time through one program operation.

For supporting the one-shot program operation, each of the first and second memory devices 1501<1:4> and 1502<1:4> of the memory system 110 includes 3-bit multi-buffers MMB, MCB, and MLB and transmission buffers TMB and TCB.

In the illustrated embodiment of FIG. 13, the 3-bit multi-buffers MMB, MCB, and MLB included in each of the first and second memory devices 1501<1:4> and 1502<1:4> serve to store 3-bit data, which are to be stored in a TLC during a one-shot program operation, at a time.

While a memory device corresponding to the TLC architecture includes 3-bit multi-buffers MMB, MCB, and MLB, a memory device corresponding to a double level cell architecture may include 2-bit multi-buffers (not illustrated), and a memory device corresponding to the quad level cell architecture may include 4-bit multi-buffers (not illustrated). That is, the type of multi-buffers included in each of the first and second memory devices 1501<1:4> and 1502<1:4> may depend on which type of memory cells are included in each of the first and second memory devices 1501<1:4> and 1502<1:4>.

Furthermore, the transmission buffers TMB and TCB included in each of the first and second memory devices 1501<1:4> and 1502<1:4> may indicate a cache buffer TCB for transmitting data inputted from or outputted to the outside of the first and second memory devices 1501<1:4> and 1502<1:4>, and a main buffer TMB for transmitting data between the plurality of memory blocks 321 and 322 included in the first and second memory devices 1501<1:4> and 1502<1:4>. In the illustrated embodiment of FIG. 13, the transmission buffers TMB and TCB are or include a main buffer TMB and a cache buffer TCB at all times, regardless of which type of memory cells are included in each of the memory blocks 321 and 322.

Figure 14:
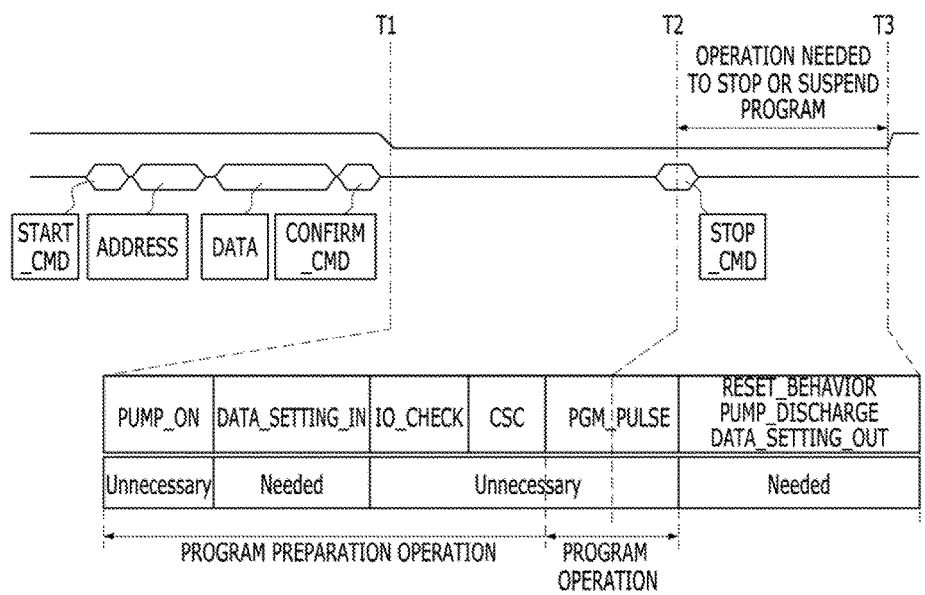
FIG. 14 is a timing diagram for describing a case in which a general program operation being performed in the memory device of FIG. 13 is suddenly suspended or stopped.

FIG. 14 is a timing diagram for describing the case in which a general program operation being performed in the memory device of FIG. 13 is suddenly suspended or stopped.

During a general program operation as illustrated in FIG. 14, when a program start command START_CMD, a program address ADDRESS, program data DATA, and a confirm command CONFIRM_CMD indicating that all of the program address ADDRESS and the program data DATA were inputted are sequentially inputted, each of the first memory devices 1501<1:4> or the second memory devices 1502<1:4> may start a program preparation operation in response to the commands and data, at a time point T1.

At this time, the program address may be used to find the position at which the program data are to be stored, among the plurality of first memory devices 1501<1:4> or the plurality of second memory devices 1502<1:4>. Furthermore, the program data may be stored in 3-bit multi-buffers MMB, MCB, and MLB included in a memory device which is to store the program data, among the plurality of first memory devices 1501<1:4> or the plurality of second memory devices 1502<1:4>.

At this time, when the program data are inputted on a page basis, one page-based program data may be stored in each of the 3-bit multi-buffers MMB, MCB, and MLB, and a total of three page-based program data may be stored in the 3-bit multi-buffers MMB, MCB, and MLB. Furthermore, when each of the first memory devices 1501<1:4> or the second memory devices 1502<1:4> include TLCs, the three page-based program data stored in the 3-bit multi-buffers MMB, MCB, and MLB may be one-shot programmed to a memory cell which correspond to one physical page or three logical pages.

The program preparation operation performed in each of the first memory devices 1501<1:4> or the second memory devices 1502<1:4> may include a data sorting operation DATA_SETTING_IN of sorting the data stored in the 3-bit multi-buffers MMB, MCB, and MLB of the first memory devices 1501<1:4> or the second memory devices 1502<1:4>, a data check operation IO_CHECK and CSC of checking the data which are sorted and stored in the 3-bit multi-buffers MMB, MCB, and MLB of the first memory devices 1501<1:4> or the second memory devices 1502<1:4> through the data sorting operation DATA_SETTING_IN, and a voltage generation operation PUMP_ON of generating a voltage which is used when the data checked through the data check operation IO_CHECK and CSC are one-shot programmed to a memory cell selected as a one-shot program target in each of the first memory devices 1501<1:4> or the second memory devices 1502<1:4>. That is, the program preparation operation may indicate an operation which is performed in each of the first memory devices 1501<1:4> or the second memory devices 1502<1:4>, in order to program the program data to a plurality of memory cells through an actual program operation.

In this way, the program preparation operation may be performed before an actual program operation is performed in each of the first memory devices 1501<1:4> or the second memory devices 1502<1:4>. At this time, the actual program operation may indicate an operation PGM_PULSE of supplying a program pulse generated through the program preparation operation to the memory cell selected as a one-shot program target in each of the first memory devices 1501<1:4> or the second memory devices 1502<1:4>, according to an ISPP (Incremental Step Pulse Program) method, in order to store the program data.

For reference, the data sorting operation DATA_SETTING_IN may indicate that the storage positions of the data stored in the 3-bit multi-buffers MMB, MCB, and MLB of the first memory devices 1501<1:4> or the second memory devices 1502<1:4> are sorted in such a form as to minimize interference occurring therebetween when the data are one-shot programmed to TLCs which correspond to one physical page or three logical pages.

After the program operation is started in each of the first memory devices 1501<1:4> or the second memory devices 1502<1:4> through the above-described process, a command STOP_CMD for suddenly stopping or suspending the program operation may be inputted at a time point T2.

A situation in which a program operation is stopped or suspended may include a variety of unpredictable cases. For example, a request for stopping the program operation may be directly made by the host 102, because the program operation does not need to be performed. In general, the program operation may require quite a long time. Thus, a request for suspending the program operation for a moment may be made in order to perform a read operation which is requested to be performed before the program operation. Furthermore, a request for stopping the program operation may be made for performing an operation of resetting the memory system 110 due to various unknown errors.

In this way, when the command STOP_CMD for suddenly stopping or suspending the program operation is inputted after the program operation is started in each of the first memory devices 1501<1:4> or the second memory devices 1502<1:4>, an operation needed to stop or suspend the program operation is performed in response to the command. That is, the operation needed to stop or suspend the program operation is performed before the program stop operation, as the program preparation operation was performed before the program operation.

In the illustrated example, the operation needed to stop or suspend the program operation includes a voltage discharge operation PUMP_DISCHARGE of discharging the voltage which was used during the program operation, a data resorting operation DATA_SETTING_OUT of resorting the data stored in the 3-bit multi-buffers MMB, MCB, and MLB of the first or second memory devices 1501<1:4> or 1502<1:4> because the state of the memory cell selected as a one-shot program target was changed while the program operation was performed, and a resetting operation RESET_BEHAVIOR of resetting internal circuits which were set to be suitable for the program operation in the memory device corresponding to a program target among the first memory devices 1501<1:4> or the second memory devices 1502<1:4>.

In this way, until the program operation is actually stopped or suspended after the command STOP_CMD for stopping or suspending the program operation is inputted to each of the first memory devices 1501<1:4> or the second memory devices 1502<1:4>, the operation needed to stop or suspend the program operation is to performed. Thus, a time difference between time points T2 and T3 may exist.

For reference, the program operation may be performed for a much longer time than the program preparation operation in each of the first memory devices 1501<1:4> or the second memory devices 1502<1:4>. However, FIG. 14 illustrates that the program operation is performed only for a short time, because the program operation is stopped or suspended immediately after the program operation is started.

When the program operation is suddenly stopped or suspended after the program operation is started in each of the first memory devices 1501<1:4> or the second memory devices 1502<1:4>, some operations may be considered to be unnecessary in the program preparation operation.

Specifically, an operation which is performed in the program preparation operation but reset in the operation needed to stop or suspend the program operation may be considered to be unnecessary.

For example, the voltage generation operation PUMP_ON among the operations performed during the program preparation operation may be reset through the voltage discharge operation PUMP_DISCHARGE of the operation needed to stop or suspend the program operation. Furthermore, the data check operation IO_CHECK and CSC among the operations performed during the program preparation operation needs to be performed again, when the data resorting operation DATA_SETTING_OUT is performed during the operation needed to stop or suspend the program operation. Thus, when the program operation is not properly completed, the data check operation IO_CHECK and CSC does not need to be performed in advance.

Thus, when the operation needed to stop or suspend the program operation is performed before the program preparation operation is completed, the voltage generation operation PUMP_ON and the data check operation IO_CHECK and CSC among the operations performed during the program preparation operation may be considered to be unnecessary.

Therefore, in an embodiment, the voltage generation operation PUMP_ON and the data check operation IO_CHECK and CSC among the operations performed during the program preparation operation may be set to be secondary preparation operations.

However, the data sorting operation DATA_SETTING_IN among the operations performed during the program preparation operation may not be classified as an unnecessary operation. The reason is that, when the data sorting operation DATA_SETTING_IN is classified as a needed operation, the time required for the operation needed to stop or suspend the program operation may be effectively minimized. The reason will be described in detail in the context of a specific program operation, according to an embodiment of the present invention.

Therefore, in an embodiment, the data sorting operation DATA_SETTING_IN among the operations performed during the program preparation operation may be set to be a necessary preparation operation.

Figure 15:
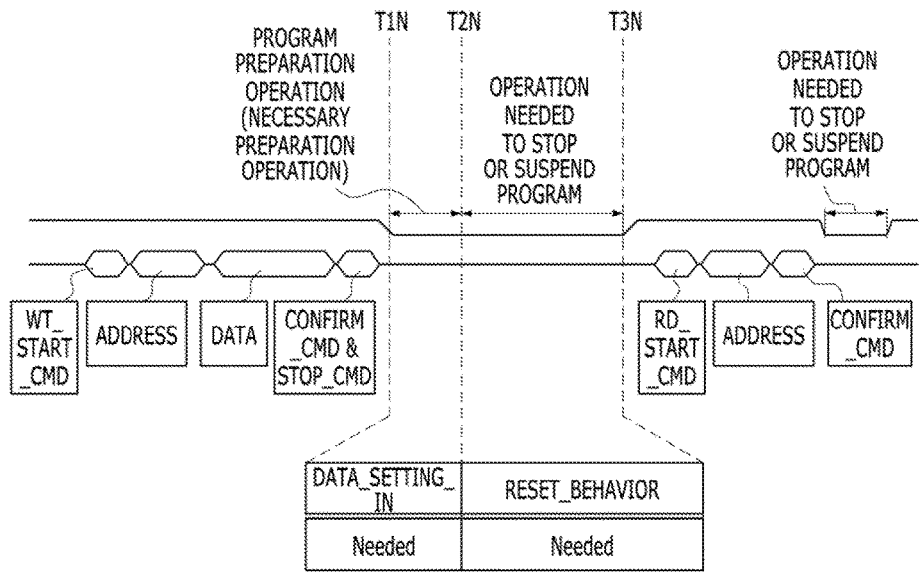
FIG. 15 is a timing diagram for describing the case in which a specific program operation being performed in the memory device of FIG. 13 is suddenly suspended or stopped.

FIG. 15 is a timing diagram for describing the case in which a specific program operation being performed in the memory device of FIG. 13 is suddenly suspended or stopped.

Referring to FIG. 15, when a program start command WT_START_CMD, a program address ADDRESS, program data DATA, and a confirm command CONFIRM_CMD indicating that all of the program address ADDRESS and the program data DATA were inputted are sequentially inputted, each of the first memory devices 1501<1:4> or the second memory devices 1502<1:4> may start a program preparation operation in response to the commands and data, as described with reference to FIG. 14.

At this time, a command STOP_CMD for stopping or suspending the program operation may be inputted at the same time as the confirm command CONFIRM_CMD during the specific program operation according to the embodiment of the present invention.

Thus, in response to the commands CONFIRM_CMD and STOP_CMD inputted at the same time during the specific program operation, the plurality of first memory devices 1501<1:4> and the plurality of second memory devices 1502<1:4> may start only a necessary preparation operation of the program preparation operation, but not start a secondary preparation operation of the program preparation operation, at a time point TiN.

That is, during the specific program operation, the plurality of first memory devices 1501<1:4> and the plurality of second memory devices 1502<1:4> may start only the data sorting operation DATA_SETTING_IN set to a necessary preparation operation of the program preparation operation, and may not start the data check operation IO_CHECK and CSC and the voltage generation operation PUMP_ON which are set as secondary preparation operations.

In this way, during the specific program operation according to the embodiment of the present invention, the operation needed to stop or suspend the program operation may be started after the necessary preparation operation of the program preparation operation, at a time point T2N.

At this time, the operation needed to stop or suspend program operation in the specific program operation according to the embodiment of the present invention may include only the resetting operation RESET_BEHAVIOR.

That is, during the specific program operation according to the embodiment of the present invention, the data sorting operation DATA_SETTING_IN which is a necessary preparation operation of the program preparation operation was performed before the operation needed to stop or suspend the program operation. Thus, during the operation needed to stop or suspend the program operation, the data resorting operation DATA_SETTING_OUT does not need to be performed.

Furthermore, during the specific program operation according to the embodiment of the present invention, the data check operation IO_CHECK and CSC and the voltage generation operation PUMP_ON, which are secondary preparation operations of the program preparation operation, were not performed before the operation needed to stop or suspend the program operation. Thus, during the operation needed to stop or suspend program, the voltage discharge operation PUMP_DISCHARGE does not need to be performed.

In this way, during the specific program operation according to the embodiment of the present invention, the confirm command CONFIRM_CMD indicating that all of the program address and the program data were inputted and the command STOP_CMD for stopping or suspending the program operation may be inputted at the same time. Thus, the program preparation operation and the operation needed to stop or suspend the program operation may be considerably simplified, and the time required for those operations may be minimized.

After the time point T3N when the specific program operation according to the embodiment of the present invention is applied to any one memory device selected as a program target among the plurality of first memory devices 1501<1:4> or the plurality of second memory devices 1502<1:4>, that is, the selected memory device performs a necessary preparation operation of the program preparation operation and performs the operation needed to stop or suspend the program operation, the program data may be stored in the 3-bit multi-buffers MMB, MCB, and MLB included in the selected memory device, and the transmission buffers TMB and TCB may be set in an empty state.

Therefore, when a read start command RD_START_CMD, a read address ADDRESS, and a confirm command CONFIRM_CMD indicating that the read address ADDRESS was inputted are sequentially inputted after the time point T3N, the selected memory device may not use the 3-bit multi-buffers MMB, MCB, and MLB, but use only the transmission buffers TMB and TCB to perform a read operation in the program stopped or suspended state.

Figure 16:
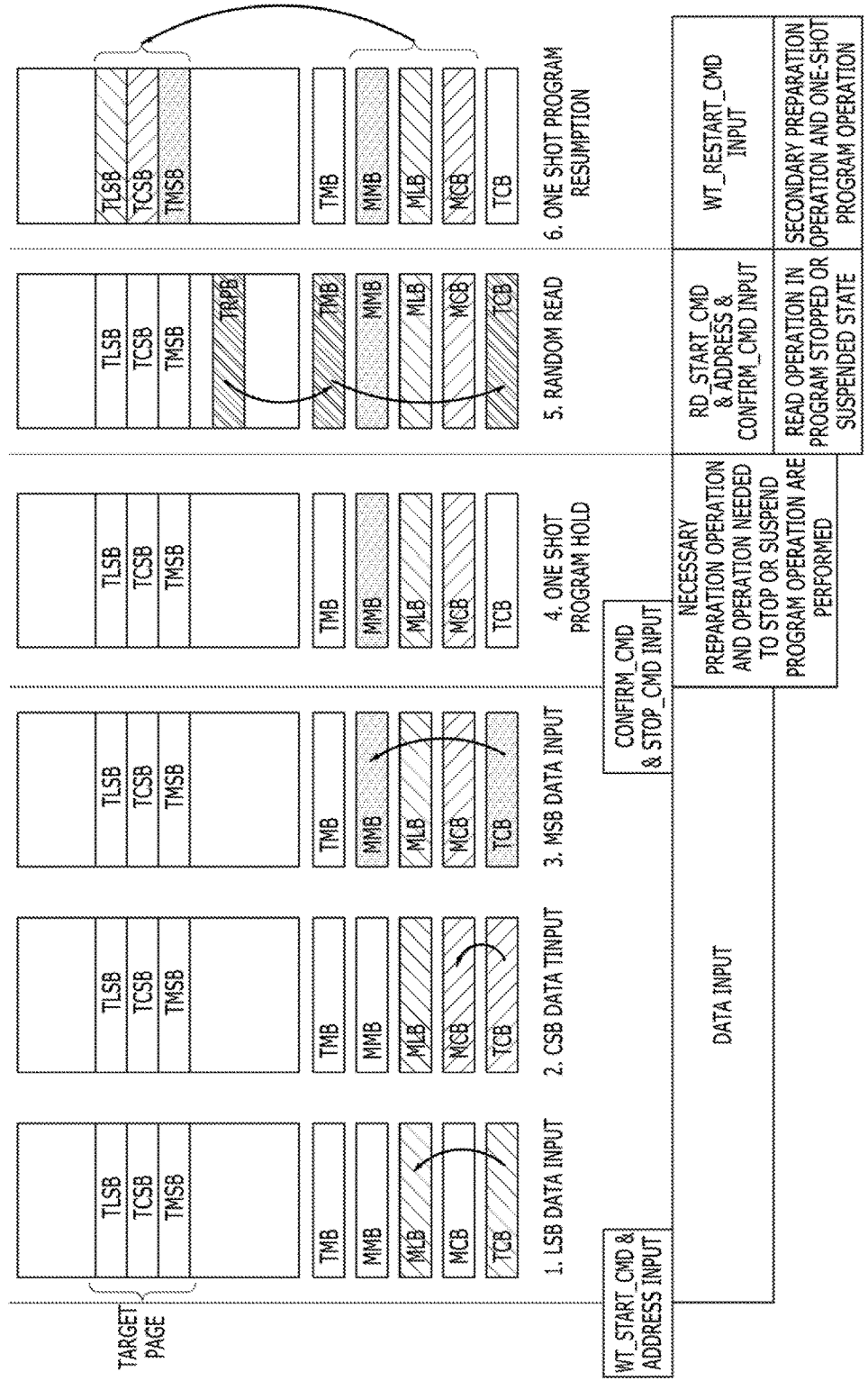
FIG. 16 is a diagram illustrating a buffer state of a memory device set to a program target, when a specific program operation, according to an embodiment of the present invention is performed.

FIG. 16 describes the buffer state of a memory device being set to a program target, when a specific program operation, according to an embodiment of the present invention is performed.

Referring to FIG. 16, each of the first memory devices 1501<1:4> or the second memory devices 1502<1:4> may sequentially store program data in the 3-bit multi-buffer MMB, MCB, and MLB, the program data being inputted after a program start command and a program address are inputted (WT_START_CMD & ADDRESS INPUT).

At this time, the program address may be used to select any one of the first or second memory devices 1501<1:4> or 1502<1:4> as a program target, and used to find a memory cell in which the program data are to be stored and which correspond to one physical page (TARGET PAGE) or three logical pages TLSB, TCSB, and TMSB, in the selected memory device. Furthermore, when the program data may be inputted on a page basis, one page-based program data may be stored in each of the 3-bit multi-buffers MMB, MCB, and MLB included in the selected memory device, and a total of three page-based program data may be stored in the 3-bit multi-buffers MMB, MCB, and MLB.

That is, when the least significant bit (LSB) data of the program data are inputted through the cache buffer TCB, the selected memory device may store the LSB data in the buffer MLB for storing the LSB data, among the 3-bit multi-buffers MMB, MCB, and MLB (1. LSB DATA INPUT). Then, when the center significant bit (CSB) data of the program data are inputted through the cache buffer TCB, the selected memory device may store the CSB data in the buffer MCB for storing the CSB data, among the 3-bit multi-buffers MMB, MCB, and MLB (2. CSB DATA INPUT). Then, when the most significant bit (MSB) data of the program data are inputted through the cache buffer TCB, the selected memory device may store the MSB data in the buffer MMB for storing the MSB data, among the 3-bit multi-buffers MMB, MCB, and MLB (3. MSB DATA INPUT).

When a command indicating that all of the program address and the program data were inputted and a command for stopping or suspending the program operation are inputted at the same time (CONFIRM_CMD & STOP_CMD INPUT) after all of the program data are inputted in the 3-bit multi-buffers MMB, MCB, and MLB of the selected memory device (DATA INPUT), the selected memory device may perform the necessary preparation operation of the program preparation operation and the operation needed to stop or suspend the program operation.

Since the operation needed to stop or suspend the program operation may be performed after the necessary preparation operation of the program preparation operation, as described with reference to FIG. 15, the program data inputted to the selected memory device may not be programmed in the selected memory cells TLSB, TCSB, and TMSB, but maintained to be stored in the 3-bit multi-buffers MMB, MCB, and MLB (4. ONE SHOT PROGRAM HOLD).

When the program data inputted to the selected memory device are not programmed in the selected memory cells TLSB, TCSB, and TMSB but maintained to be stored in the 3-bit multi-buffers MMB, MCB, and MLB (4. ONE SHOT PROGRAM HOLD), the transmission buffers TMB and TCB of the selected memory device may be set in an empty state.

In this state, when a read operation is required for the selected memory device, or when a read start command, a read address, and a confirm command indicating that the read address was inputted are received (RD_START_CMD & ADDRESS & CONFIRM_CMD INPUT), the selected memory device may not use the 3-bit multi-buffers MMB, MCB, and MLB, but use only the transmission buffers TMB and TCB to read data stored in the memory cells TRPB of the selected memory device (5. RANDOM READ). That is, a read operation in the program stopped or suspended state may be performed on the selected memory device (5. RANDOM READ).

At this time, as illustrated in FIG. 16, the physical positions of the selected memory cells TLSB, TCSB, and TMSB to which the program data inputted to the selected memory device are to be one-shot programmed may be different from the physical positions of the memory cells TRPB which are targets of the read operation in the program stopped or suspended state.

Furthermore, since the memory cells TRPB which are targets of the read operation in the program stopped or suspended state are also TLCs, a maximum of three page-based data, that is, 3-bit data may be stored in each memory cell. In this state, however, the selected memory device may use only the transmission buffers TMB and TCB capable of transmitting one page-based data, that is, 1-bit data from each memory cell. Thus, when three page-based data are read from the memory cells TRPB which are targets of the read operation in the program stopped or suspended state, the selected memory device needs to repetitively read one page-based data, that is, 1-bit data three times from each of the memory cells TRPB.

In the state in which the program data are maintained to be stored in the 3-bit multi-buffers MMB, MCB, and MLB (4. ONE SHOT PROGRAM HOLD), the read operation may be optionally performed on the selected memory device (5. RANDOM READ). That is, in the state in which the program data are maintained to be stored in the 3-bit multi-buffers MMB, MCB, and MLB (4. ONE SHOT PROGRAM HOLD), the read operation (5. RANDOM READ) may occur or not.

Furthermore, regardless of whether the read operation (5. RANDOM READ) is performed, the program operation may be resumed (6. ONE SHOT PROGRAM RESUMPTION) in the state in which the program data are maintained to be stored in the 3-bit multi-buffers MMB, MCB, and MLB (4. ONE SHOT PROGRAM HOLD). At this time, a program restart command may be inputted (WT_RE-START_CMD INPUT), in order to resume the program operation for the selected memory device. After the program restart command is inputted (WT_RESTART_CMD INPUT), the program operation may be resumed as follows: first a secondary preparation operation of the program preparation operation which was not performed before the operation for stopping or suspending program is performed, and then the program operation is performed.

At this time, the program operation may include one-shot programming of the program data stored in the 3-bit multi-buffers MMB, MCB, and MLB of the selected memory device to the selected memory cells TLSB, TCSB, and TMSB of the selected memory device, as illustrated in FIG. 16.

For reference, FIG. 16 illustrates that the program data stored in the 3-bit multi-buffers MMB, MCB, and MLB of the selected memory device seem to be one-shot programmed to the selected memory cells TLSB, TCSB, and TMSB of the selected memory device, without passing through the main buffer TMB. However, this is only an example, for simple description. In reality, the program data may be one-shot programmed through the main buffer TMB.

Figure 17:
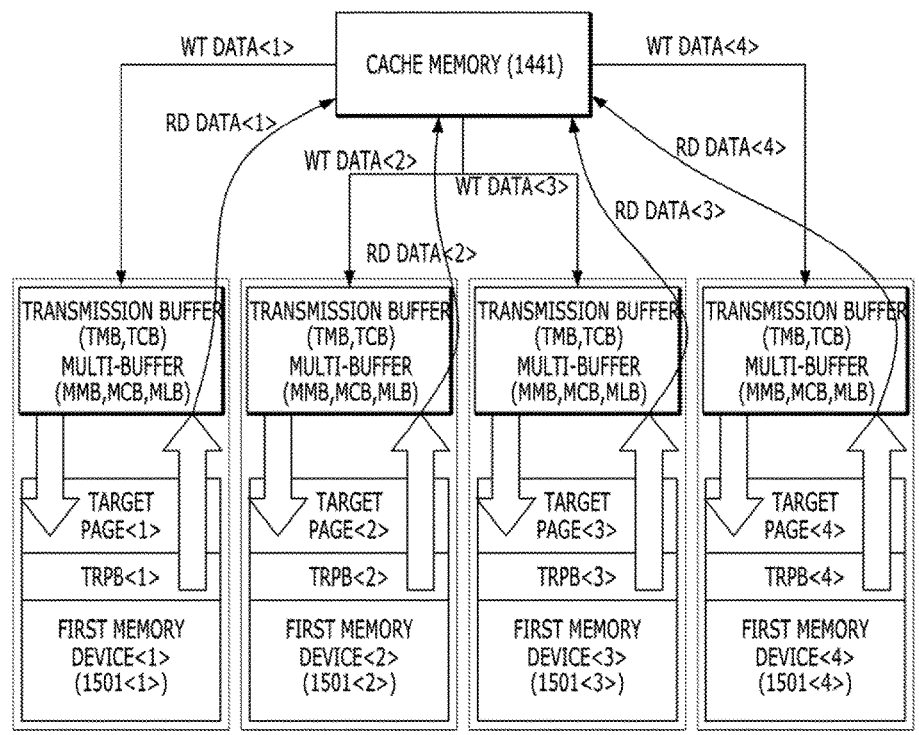

FIGS. 17 and 18 is a block diagram illustrating an example in which the specific program operation, according to the embodiment of the present invention, is applied to the memory system of FIGS. 12 to 16.

FIG. 17 illustrates the plurality of first memory devices 1501<1:4> and the plurality of second memory devices 1502<1:4> which are included in the memory system 110 in accordance with the present embodiment.

Furthermore, FIG. 17 illustrates the memory 144 included in the controller 130 of the memory system 110 in an embodiment, as a cache memory 1441, in order to emphasize the role of the cache memory.

Specifically, the controller 130 may perform an operation of programming program data WT_DATA<1:4> to the plurality of first memory devices 1501<1:4>. The program data WT_DATA<1:4> may be cached in the cache memory 1441 to be transmitted and programmed to the plurality of first memory devices 1501<1:4>. That is, the first program data WT_DATA<1> may be transmitted and programmed to the first-first memory device 1501<1>, and the second program data WT_DATA<2> may be transmitted and programmed to the second-first memory device 1501<2>. The third program data WT_DATA<3> may be transmitted and programmed to the third-first memory device 1501<3>, and the fourth program data WT_DATA<4> may be transmitted and programmed to the fourth-first memory device 1501<4>.

At this time, the cache memory 1441 needs to have a relatively large size, in order to store all of the program data WT_DATA<1:4>, which are to be programmed to the plurality of first memory devices 1501<1:4>, at a time.

However, during the specific program operation according to the embodiment of the present invention, the program data WT_DATA<1:4> to be programmed to the respective first memory devices 1501<1:4> may be stored in the 3-bit multi-buffers MMB, MCB, and MLB included in the respective first memory devices 1501<1:4>.

For example, the first program data WT_DATA<1> may be transferred and stored into the 3-bit multi-buffers MMB, MCB, and MLB included in the first-first memory device 1501<1> at the point of time that the first program data WT_DATA<1> are cached in the cache memory 1441, and the second program data WT_DATA<2> may be transferred and stored into the 3-bit multi-buffers MMB, MCB, and MLB included in the second-first memory device 1501<2> at the point of time that the second program data WT_DATA<2> are cached in the cache memory 1441. The third program data WT_DATA<3> may be transferred and stored into the 3-bit multi-buffers MMB, MCB, and MLB included in the third-first memory device 1501<3> at the point of time that the third program data WT_DATA<3> are cached in the cache memory 1441, and the fourth program data WT_DATA<4> may be transferred and stored into the 3-bit multi-buffers MMB, MCB, and MLB included in the fourth-first memory device 1501<4> at the point of time that the fourth program data WT_DATA<4> are cached in the cache memory 1441.

In this way, the controller 130 in accordance with the present embodiment may transfer and store the program data WT_DATA<1:4> cached in the cache memory 1441 into the 3-bit multi-buffers MMB, MCB, and MLB included in the plurality of first memory devices 1501<1:4>, respectively, whenever the size of the program data WT_DATA<1:4> cached in the cache memory 1441 becomes equal to the size of data which may be simultaneously stored in the 3-bit multi-buffers MMB, MCB, and MLB included in the respective first memory devices 1501<1:4>, for example, the size corresponding to three pages.

Furthermore, when the program data WT_DATA<1:4> cached in the cache memory 1441 are transferred and stored into the 3-bit multi-buffers MMB, MCB, and MLB included in the respective first memory devices 1501<1:4>, the controller 130 may not only use the general program operation illustrated in FIG. 14, but also use the specific program operation described with reference to FIGS. 15 and 16. Since the general program operation illustrated in FIG. 14 is a publicly-known program operation, the following descriptions will be based on the specific program operation of FIGS. 15 and 16 according to the embodiment of the present invention.

Thus, the controller 130 may perform the operation of transferring and storing the program data WT_DATA<1:4> cached in the cache memory 1441 into the 3-bit multi-buffers MMB, MCB, and MLB included in the respective first memory devices 1501<1:4> at the same time as an operation of outputting read data RD_DATA<1:4> stored in read-target memory cells TRPB<1:4> of the respective first memory devices 1501<1:4>.

That is, when programming the program data WT_DATA<1:4> to the plurality of first memory devices 1501<1:4>, the controller 130 may read the read data RD_DATA<1:4> from the read-target memory cells TRPB<1:4> of the respective first memory devices 1501<1:4> using only the transmission buffers TMB and TCB, without using the 3-bit multi-buffers MMB, MCB, and MLB included in the respective first memory devices 1501<1:4>, even in a case where a read operation is requested for the first memory devices 1501<1:4> in a state where the input of the program data WT_DATA<1:4> is not ended or the 3-bit multi-buffers MMB, MCB, and MLB of the respective first memory devices 1501<1:4> are not full.

The above-described operation of the controller 130, that is, the operation of transferring and storing the program data WT_DATA<1:4> cached in the cache memory 1441 into the 3-bit multi-buffers MMB, MCB, and MLB included in the respective first memory devices 1501<1:4> may be continued until no more data are cached in the cache memory 1441 because the input of the program data WT_DATA<1:4> is ended or the 3-bit multi-buffers MMB, MCB, and MLB included in the respective first memory devices 1501<1:4> are full.

When no more data are cached in the cache memory 1441 because the input of the program data WT_DATA<1:4> is ended or the 3-bit multi-buffers MMB, MCB, and MLB included in the respective first memory devices 1501<1:4> are full, the controller 130 may control the plurality of first memory devices 1501<1:4> to perform a secondary preparation operation of the program preparation operation at the same time, and control the plurality of first memory devices 1501<1:4> to perform the program operation. Then, the program data WT_DATA<1:4> stored in the 3-bit multi-buffers MMB, MCB, and MLB included in the respective first memory devices 1501<1:4> may be one-shot programmed to the program-target memory cells TLSB, TCSB, and TMSB of the respective first memory devices 1501<1:4>.

Furthermore, the operation illustrated in FIG. 17, that is, the operation of programming the program data WT_DATA<1:4> to the plurality of first memory devices 1501<1:4> may be applied to the operation of programming the program data WT_DATA<1:4> to the plurality of second memory devices 1502<1:4>.

Specifically, the program data WT_DATA<1:4> cached in the cache memory 1441 may be transmitted and programmed to the plurality of second memory devices 1502<1:4>. That is, the first program data WT_DATA<1> may be transmitted and programmed to the first-second memory device 1502<1>, and the second program data WT_DATA<2> may be transmitted and programmed to the second-second memory device 1502<2>. The third program data WT_DATA<3> may be transmitted and programmed to the third-second memory device 1502<3>, and the fourth program data WT_DATA<4> may be transmitted and programmed to the fourth-second memory device 1502<4>.

At this time, the cache memory 1441 needs to have a relatively large size, for storing all of the program data WT_DATA<1:4>, which are to be programmed to the plurality of second memory devices 1502<1:4>, at a time.

However, during a specific program operation, according to an embodiment of the present invention, the program data WT_DATA<1:4> to be programmed to the respective second memory devices 1502<1:4> may be stored in the 3-bit multi-buffers MMB, MCB, and MLB included in the respective second memory devices 1501<1:4>.

For example, the first program data WT_DATA<1> may be transferred and stored into the 3-bit multi-buffers MMB, MCB, and MLB included in the first-second memory device 1502<1> at the point of time that the first program data WT_DATA<1> are cached in the cache memory 1441, and the second program data WT_DATA<2> may be transferred and stored into the 3-bit multi-buffers MMB, MCB, and MLB included in the second-second memory device 1502<2> at the point of time that the second program data WT_DATA<2> are cached in the cache memory 1441. The third program data WT_DATA<3> may be transferred and stored into the 3-bit multi-buffers MMB, MCB, and MLB included in the third-second memory device 1502<3> at the point of time that the third program data WT_DATA<3> are cached in the cache memory 1441, and the fourth program data WT_DATA<4> may be transferred and stored into the 3-bit multi-buffers MMB, MCB, and MLB included in the fourth-second memory device 1502<4> at the point of time that the fourth program data WT_DATA<4> are cached in the cache memory 1441.

In this way, the controller 130 in accordance with the present embodiment may transfer and store the program data WT_DATA<1:4> cached in the cache memory 1441 into the 3-bit multi-buffers MMB, MCB, and MLB included in the plurality of second memory devices 1502<1:4>, respectively, whenever the size of the program data WT_DATA<1:4> cached in the cache memory 1441 becomes equal to the size of data which may be simultaneously stored in the 3-bit multi-buffers MMB, MCB, and MLB included in the respective second memory devices 1502<1:4>, for example, the size corresponding to three pages.

Furthermore, when the program data WT_DATA<1:4> cached in the cache memory 1441 are transferred and stored into the 3-bit multi-buffers MMB, MCB, and MLB included in the respective second memory devices 1502<1:4>, the controller 130 may not only use the general program operation illustrated in FIG. 14, but also use the specific program operation of FIGS. 15 and 16. Since the general program operation illustrated in FIG. 14 is a publicly-known program operation, the following descriptions will be based on the specific program operation of FIGS. 15 and 16, according to an embodiment of the present invention.

Thus, the controller 130 may perform the operation of transferring and storing the program data WT_DATA<1:4> cached in the cache memory 1441 into the 3-bit multi-buffers MMB, MCB, and MLB included in the respective second memory devices 1502<1:4> at the same time as an operation of outputting read data RD_DATA<1:4> stored in read-target memory cells TRPB<1:4> of the respective second memory devices 1502<1:4>.

That is, when programming the program data WT_DATA<1:4> to the plurality of second memory devices 1502<1:4>, the controller 130 may read the read data RD_DATA<1:4> from the read-target memory cells TRPB<1:4> of the respective second memory devices 1502<1:4> using only the transmission buffers TMB and TCB, without using the 3-bit multi-buffers MMB, MCB, and MLB included in the respective second memory devices 1502<1:4>, even in case where a read operation is requested for the second memory devices 1502<1:4> in a state where the input of the program data WT_DATA<1:4> is not ended or the 3-bit multi-buffers MMB, MCB, and MLB of the respective second memory devices 1502<1:4> are not full.

The above-described operation of the controller 130, that is, the operation of transferring and storing the program data WT_DATA<1:4> cached in the cache memory 1441 into the 3-bit multi-buffers MMB, MCB, and MLB included in the respective second memory devices 1502<1:4> may be continued until no more data are cached in the cache memory 1441 because the input of the program data WT DATA<1:4> is ended or the 3-bit multi-buffers MMB, MCB, and MLB included in the respective second memory devices 1502<1:4> are full.

When no more data are cached in the cache memory 1441 because the input of the program data WT DATA<1:4> is ended or the 3-bit multi-buffers MMB, MCB, and MLB included in the respective second memory devices 1502<1:4> are full, the controller 130 may control the plurality of second memory devices 1502<1:4> to perform a secondary preparation operation of the program preparation operation at the same time, and control the plurality of second memory devices 1502<1:4> to perform a program operation. Then, the program data WT_DATA<1:4> stored in the 3-bit multi-buffers MMB, MCB, and MLB included in the respective second memory devices 1501<1:4> may be one-shot programmed to the program-target memory cells TLSB, TCSB, and TMSB of the respective second memory devices 1501<1:4>.

Referring to FIG. 18, the specific program operation according to the embodiment of the present invention may be performed in the plurality of first memory devices 1501<1:4> and the plurality of second memory devices 1502<1:4> according to an interleaving scheme.

Specifically, at a period in which the program operation of one-shot programming the data stored in the 3-bit multi-buffers MMB, MCB, and MLB of the respective second memory devices 1502<1:4> to the program-target memory cells TLSB, TCSB, and TMSB is performed after the secondary preparation operation of the program preparation operation is started in the second memory devices 1502<1:4>, the plurality of first memory devices 1501<1:4> may store the program data WT_DATA<1:4> in the 3-bit multi-buffers MMB, MCB, and MLB thereof in a state where the first memory devices 1501<1:4> started only the necessary preparation operation of the program preparation operation, but did not start the secondary preparation operation.

On the other hand, at a period in which the program operation of one-shot programming the data stored in the 3-bit multi-buffers MMB, MCB, and MLB of the respective first memory devices 1501<1:4> to the program-target memory cells TLSB, TCSB, and TMSB is performed after the secondary preparation operation of the program preparation operation is started in the first memory devices 1501<1:4>, the plurality of second memory devices 1502<1:4> may store the program data WT_DATA<1:4> in the 3-bit multi-buffers MMB, MCB, and MLB thereof in a state where the second memory devices 1502<1:4> started only the necessary preparation operation of the program preparation operation, but did not start the secondary preparation operation.

As described with reference to FIG. 18, the specific program operation according to the embodiment of the present invention may be effectively used when the plurality of first memory devices 1501<1:4> and the plurality of second memory devices 1502<1:4> are operated according to the interleaving scheme.

Specifically, when the program data WT_DATA<1:4> are directly inputted from the host 102 and stored in the first memory devices 1501<1:4> or the second memory devices 1502<1:4>, the 3-bit multi-buffers MMB, MCB, and MLB included in each of the first memory devices 1501<1:4> or the second memory devices 1502<1:4> may be operated for the same use as the cache memory 1441. Thus, the physical size of the cache memory 1441 may be minimized.

Furthermore, when the program data WT_DATA<1:4> are directly inputted from the host 102 and stored in the first memory devices 1501<1:4> or the second memory devices 1502<1:4>, the read data RD_DATA<1:4> may be read from the respective first memory devices 1501<1:4> or the respective second memory devices 1502<1:4> and outputted to the host 102, even in a state where the program operation is not completed. Thus, even when program operations and read operations are alternately and randomly requested from the host 102, all of the program operations and the read operations may be performed in a state where a minimum waiting time is consumed.

Furthermore, the specific program operation according to an embodiment of the present invention may be effectively applied when the plurality of first memory devices 1501<1:4> and the plurality of second memory devices 1502<1:4> need to perform a garbage collection operation as a background operation, instead of a request from the host 102.

Specifically, when the specific program operation according to an embodiment of the present invention is used, the plurality of first memory devices 1501<1:4> may simultaneously perform a garbage collection operation in a state where the first memory devices 1501<1:4> are set to one group. Similarly, the plurality of second memory devices 1502<1:4> may simultaneously perform a garbage collection operation in a state where the second memory devices 1502<1:4> are set to one group. Furthermore, the plurality of first memory devices 1501<1:4> and the plurality of second memory devices 1502<1:4> may alternately perform a garbage collection operation according to the interleaving scheme, in a state where the plurality of first memory devices 1501<1:4> and the plurality of second memory devices 1502<1:4> are set to the respective groups.

First, the case in which the plurality of first memory devices 1501<1:4> simultaneously perform a garbage collection operation in a state where the first memory devices 1501<1:4> are set to one group will be described as follows. The read data RD_DATA<1:4> may include valid data which had been stored in respective victim blocks of the first memory devices 1501<1:4>. In this way, the valid data which had been stored in the respective victim blocks of the first memory devices 1501<1:4> may be read as the read data RD_DATA<1:4>, cached into the cache memory 1441, and then programmed as the program data WT_DATA<1:4> to target blocks of the first memory devices 1501<1:4>. That is, the program data WT_DATA<1:4> may indicate the read data RD_DATA<1:4> which are randomly read from the plurality of first memory devices 1501<1:4> during a garbage collection operation.

Thus, in order to smoothly perform the garbage collection operations at the same time after the first memory devices 1501<1:4> are set to one group, the first memory devices 1501<1:4> are to perform a read operation even while performing a program operation.

That is, when the specific program operation is applied, the plurality of first memory devices 1501<1:4> may be set to one group, and then smoothly perform the garbage collection operations at the same time.

That is because, when programming the program data WT_DATA<1:4> to the plurality of first memory devices 1501<1:4> during the specific program operation, the controller 130 may read the read data RD_DATA<1:4> from the read-target memory cells TRPB<1:4> of the respective first memory devices 1501<1:4> using only the transmission buffers TMB and TCB, without using the 3-bit multi-buffers MMB, MCB, and MLB included in the respective first memory devices 1501<1:4>, even in case where a read operation is requested for the first memory devices 1501<1:4> in a state where the input of the program data WT_DATA<1:4> is not ended or the 3-bit multi-buffers MMB, MCB, and MLB of the respective first memory devices 1501<1:4> are not full.

Next, the case in which the plurality of second memory devices 1502<1:4> simultaneously perform garbage collection operations in a state where the second memory devices 1502<1:4> are set to one group will be described as follows. The read data RD_DATA<1:4> may include valid data which had been stored in respective victim blocks of the second memory devices 1502<1:4>. In this way, the valid data which had been stored in the respective victim blocks of the second memory devices 1502<1:4> may be read as the read data RD_DATA<1:4>, cached into the cache memory 1441, and then programmed as the program data WT_DATA<1:4> to target blocks of the second memory devices 1502<1:4>. That is, the program data WT_DATA<1:4> may indicate the read data RD_DATA<1:4> which are randomly read from the plurality of second memory devices 1501<1:4> during a garbage collection operation.

Thus, in order to smoothly perform the garbage collection operations at the same time after the second memory devices 1501<1:4> are set to one group, the second memory devices 1501<1:4> are to perform a read operation even while performing a program operation.

That is, when the specific program operation is applied, the plurality of second memory devices 1501<1:4> may be set to one group, and then smoothly perform the garbage collection operations at the same time.

That is because, when programming the program data WT_DATA<1:4> to the plurality of second memory devices 1502<1:4> during the specific program operation according to the embodiment of the present invention, the controller 130 may read the read data RD_DATA<1:4> from the read-target memory cells TRPB<1:4> of the respective second memory devices 1502<1:4> using only the transmission buffers TMB and TCB, without using the 3-bit multi-buffers MMB, MCB, and MLB included in the respective second memory devices 1502<1:4>, even in case where a read operation is requested for the second memory devices 1502<1:4> in a state where the input of the program data WT_DATA<1:4> is not ended or the 3-bit multi-buffers MMB, MCB, and MLB of the respective second memory devices 1502<1:4> are not full.

Furthermore, the controller 130 may alternately perform the garbage collection operations of the first and second memory devices set to respective groups according to the interleaving scheme as described with reference to FIG. 18.

In accordance with the embodiments, when program data are programmed to a plurality of memory devices, the memory system and the operation method thereof may control the plurality of memory devices not to start a program operation, until the program data are buffered in all the page buffers of the respective memory devices.

Even when an event which needs to suddenly suspend or stop the program operation occurs before the program data are buffered in all the page buffers of the memory devices, the memory system and the operation method thereof do not need to cancel the program preparation operation for each of the memory devices, and thus may rapidly and stably suspend or stop the program operation.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a plurality of first and second memory devices each comprising M-bit multi-level cells (MLCs), M-bit multi-buffers, and one or more transmission buffers, wherein M is an integer equal to or more than 2;
a cache memory suitable for caching data inputted to or outputted from the plurality of first and second memory devices; and
a controller suitable for programming program data cached by the cache memory to a memory device selected among the first and second memory devices by transferring the program data to M-bit multi-buffers of the selected memory device whenever the program data are cached by M bits into the cache memory, and controlling the selected memory device to perform a necessary preparation operation, except for a secondary preparation operation, of a program preparation operation, until an input of the program data is ended or the M-bit multi-buffers of the selected memory device are full,
wherein when the input of the program data is ended or the M-bit buffers of the selected memory device are full, the controller controls the selected memory device to perform the secondary preparation operation of the program preparation operation, and then one-shot programs data stored in the M-bit multi-buffers of the selected memory device to first M-bit MLCs of the selected memory device through transmission buffers of the selected memory device,
wherein the necessary preparation operation of the program preparation operation comprises a data sorting operation of sorting the data stored in the M-bit multi-buffers of the selected memory device, and the secondary preparation operation of the program preparation operation comprises a data checking operation of checking data which are sorted and stored in the M-bit multi-buffers of the selected memory device through the data sorting operation, and an operation of generating a voltage which is used when data checked through the data checking operation are one-shot programmed to the first M-bit MLCs of the selected memory device, and
wherein when a read operation is requested for the selected memory device before the input of the program data is ended or the M-bit multi-buffers of the first memory devices are full while the program data are programmed to the selected memory device, the controller outputs read data from second M-bit MLCs of the selected memory device through the transmission buffers of the selected memory device one bit by one bit, without using the M-bit multi-buffers of the selected memory device, the read data comprising data outputted from a memory block selected by a request of a host or valid data outputted from a victim block of the first or second memory devices during a garbage collection operation.

2. The memory system of claim 1, wherein:
while each of the first memory devices performs the secondary preparation operation of the program preparation operation and data stored in the M-bit multi-buffers of the first memory device are one-shot programmed to the M-bit MLCs thereof, each of the second memory devices performs the necessary preparation operation, except for the secondary preparation operation, of the program preparation operation and the program data are stored in the M-bit multi-buffers of the second memory device; and
while each of the second memory devices performs the secondary preparation operation of the program preparation operation and data stored in the M-bit multi-buffers of the second memory device are one-shot programmed to the M-bit MLCs thereof, each of the first memory devices performs the necessary preparation operation, except for the secondary preparation operation, of the program preparation operation and the program data are stored in the M-bit multi-buffers of the first memory device.

3. The memory system of claim 1, wherein the program data comprise data which are to be stored in a memory block selected by a request of the host or valid data which are to be stored in a target block of the first or second memory devices during the garbage collection operation.

4. An operation method of a memory system which includes a plurality of first and second memory devices each including M-bit multi-level cells (MLCs), M-bit multi-buffers, and one or more transmission buffers, wherein the M is an integer equal to or more than 2, and a cache memory for caching data inputted to or outputted from the plurality of first and second memory devices, the operation method comprising:

transferring program data cached by the cache memory to M-bit multi-buffers of a memory device selected among the first and second memory devices, whenever the program data are cached by M bits into the cache memory, to program the program data to the selected memory device;

controlling the selected memory device to perform a necessary preparation operation, except for a secondary preparation operation, of a program preparation operation, until all of the program data are stored in the M-bit multi-buffers of the selected memory device or the M-bit multi-buffers of the selected memory device are full through the transferring of the program data;

when all of the program data are stored in the M-bit multi-buffers of the selected memory device or the M-bit multi-buffers of the selected memory device are full through the transferring of the program data, controlling the selected memory device to perform the secondary preparation operation of the program preparation operation, and one-shot programming data stored in the M-bit multi-buffers of the selected memory device to first M-bit MLCs of the selected memory device through transmission buffers of the selected memory device, wherein the necessary preparation operation of the program preparation operation comprises a data sorting operation of sorting the data stored in the M-bit multi-buffers of the selected memory device, and the secondary preparation operation of the program preparation operation comprises a data checking operation of checking data which are sorted and stored in the M-bit multi-buffers of the selected memory device through the data sorting operation, and an operation of generating a voltage which is used when data checked through the data checking operation are one-shot programmed to the first M-bit MLCs of the selected memory device; and outputting read data from second M-bit MLCs of the selected memory device through the transmission buffers of the selected memory device one bit by one bit, without using the M-bit buffers of the selected memory device, when a read operation is requested for the selected memory device while the program data are stored in the M-bit multi-buffers of the selected memory device through the transferring of the program data, wherein the read data comprise data outputted from a memory block selected by a request of a host or valid data outputted from a victim block of the first or second memory devices during a garbage collection operation.

5. The operation method of claim 4, wherein:
while each of the first memory devices performs the secondary preparation operation of the program preparation operation and data stored in the M-bit multi-buffers of the first memory device are one-shot programmed to the M-bit MLCs thereof, each of the second memory devices performs the necessary preparation operation, except for the secondary preparation operation, of the program preparation operation and the program data are stored in the M-bit multi-buffers of the second memory device; and while each of the second memory devices performs the secondary preparation operation of the program preparation operation and data stored in the M-bit multi-buffers of the second memory device are one-shot programmed to the M-bit MLCs thereof, each of the first memory devices performs the necessary preparation operation, except for the secondary preparation operation, of the program preparation operation and the program data are stored in the M-bit multi-buffers of the first memory device.

6. The operation method of claim 4, wherein the program data comprise data which are to be stored in a memory block selected by a request of a host or valid data which are to be stored in a target block of the first or second memory devices during a garbage collection operation.

7. A memory system comprising:
a plurality of first and second memory devices each comprising M-bit multi-level cells (MLCs), M-bit multi-buffers, and one or more transmission buffers, wherein the M is an integer equal to or more than 2;
a cache memory suitable for caching data inputted to or outputted from the plurality of first and second memory devices; and
a controller suitable for programming program data cached by the cache memory to first MLCs of a memory device selected among the first and second memory devices through M-bit multi-buffers of the selected memory device,
wherein the controller controls the selected memory device to perform a necessary preparation operation of a program preparation operation while the program data are transferred to and stored in the M-bit multi-buffers thereof, and to perform a secondary preparation operation of the program preparation operation while data stored in the M-bit multi-buffers thereof are one-short programmed to the first MLCs through transmission buffers thereof;
wherein the necessary preparation operation of the program preparation operation comprises a data sorting operation of sorting the data stored in the M-bit multi-buffers of the selected memory device, and the secondary preparation operation of the program preparation operation comprises a data checking operation of checking data which are sorted and stored in the M-bit multi-buffers of the selected memory device through the data sorting operation, and an operation of generating a voltage which is used when data checked through the data checking operation are one-shot programmed to the first M-bit MLCs of the selected memory device, and
wherein while the selected memory device performs the necessary preparation operation of the program preparation operation, the controller outputs read data from second M-bit MLCs of the selected memory device through the transmission buffers of the selected memory device one bit by one bit, without using the M-bit multi-buffers thereof.

8. The memory system of claim 7, wherein:
while the first memory devices performs the secondary preparation operation of the program preparation operation, the second memory devices perform the necessary preparation operation of the program preparation operation; and
while the second memory devices performs the secondary preparation operation of the program preparation operation, the first memory devices perform the necessary preparation operation of the program preparation operation.

* * * * *